(12) United States Patent
Nakanishi

(10) Patent No.: US 9,207,493 B2
(45) Date of Patent: Dec. 8, 2015

(54) ELECTRONIC APPARATUS

(71) Applicant: EPSON IMAGING DEVICES CORPORATION, Nagano (JP)

(72) Inventor: Daisuke Nakanishi, Matsumoto (JP)

(73) Assignee: EPSON IMAGING DEVICES CORPORATION, Nagano (JP)

( * ) Notice: Subject to any disclaimer, the term of this patent is extended or adjusted under 35 U.S.C. 154(b) by 0 days.

(21) Appl. No.: 13/845,845

(22) Filed: Mar. 18, 2013

(65) Prior Publication Data
US 2013/0215337 A1   Aug. 22, 2013

Related U.S. Application Data

(63) Continuation of application No. 12/505,021, filed on Jul. 17, 2009, now abandoned.

(30) Foreign Application Priority Data

Jul. 31, 2008 (JP) .................................. 2008-198374
Apr. 21, 2009 (JP) .................................. 2009-102732

(51) Int. Cl.
| G02F 1/1333 | (2006.01) |
| G02F 1/1335 | (2006.01) |
| G09F 13/04 | (2006.01) |
| H04N 9/12 | (2006.01) |
| F21V 14/02 | (2006.01) |

(52) U.S. Cl.
CPC .......... *G02F 1/133608* (2013.01); *F21V 14/02* (2013.01); *G02F 1/133606* (2013.01); *G09F 13/04* (2013.01); *H04N 9/12* (2013.01)

(58) Field of Classification Search
CPC ................... G02F 1/133608; G02F 1/133603; G02F 1/133604; G02F 1/133605; G02F 1/133606; G02F 1/133308; G02F 2001/133314; G09F 13/04; H04N 9/12; F21V 14/02
USPC ......... 362/600–632; 349/58, 61–65, 155, 156
See application file for complete search history.

(56) References Cited

U.S. PATENT DOCUMENTS

| 6,979,102 B2 * | 12/2005 | You ................................ 362/218 |
| 7,339,637 B2 * | 3/2008 | Chen et al. ....................... 349/65 |
| 7,357,535 B2 | 4/2008 | Tsai et al. |

(Continued)

FOREIGN PATENT DOCUMENTS

| JP | 2002-132173 A | 5/2002 |
| JP | 2005-108851 A | 4/2005 |

(Continued)

*Primary Examiner* — Dung Nguyen
*Assistant Examiner* — David Chung
(74) *Attorney, Agent, or Firm* — Hauptman Ham, LLP

(57) ABSTRACT

An electronic apparatus includes a back light unit that has a light source, an optical member that is arranged so as to face the irradiation direction of the light of the light source, and a spacer that supports the optical member from the light source side and is arranged in a state in which the optical member is arranged parallel to the direction of gravity or inclined with respect to the direction of gravity, and a display panel that is arranged so as to be superimposed on the optical member of the back light unit. In the back light unit, the number of spacers arranged in an upper half area of the optical member with respect to the direction of gravity is configured to be smaller than that of the spacers arranged in a lower half area of the optical member with respect to the direction of gravity.

9 Claims, 21 Drawing Sheets

(56) References Cited

U.S. PATENT DOCUMENTS

| | | |
|---|---|---|
| 7,408,599 B2 | 8/2008 | Tsubokura et al. |
| 7,505,671 B2 * | 3/2009 | Hagiwara et al. .............. 386/291 |
| 7,510,318 B2 * | 3/2009 | Chen ............................ 362/634 |
| 7,534,007 B2 | 5/2009 | Lai et al. |
| 8,432,499 B2 * | 4/2013 | Yokota ........................... 348/794 |
| 2001/0055075 A1 * | 12/2001 | Wang et al. ..................... 349/58 |
| 2002/0044437 A1 | 4/2002 | Lee |
| 2005/0041411 A1 | 2/2005 | Wu |
| 2005/0265020 A1 * | 12/2005 | Kim .............................. 362/225 |
| 2007/0103908 A1 | 5/2007 | Tabito et al. |
| 2007/0121344 A1 * | 5/2007 | Chang ........................... 362/632 |
| 2008/0019145 A1 * | 1/2008 | Cho et al. ...................... 362/601 |
| 2008/0117356 A1 | 5/2008 | Oku et al. |

FOREIGN PATENT DOCUMENTS

| | | |
|---|---|---|
| JP | 2005-135670 A | 5/2005 |
| JP | 2006-278077 A | 10/2006 |
| JP | 2009032626 A * | 2/2009 |

* cited by examiner (FIRST ROTATION POSITION: R1)

(FIRST ROTATION POSITION: R1)

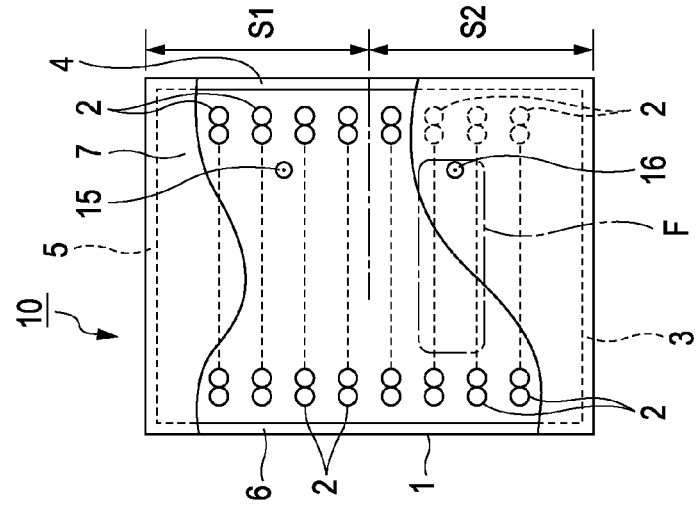
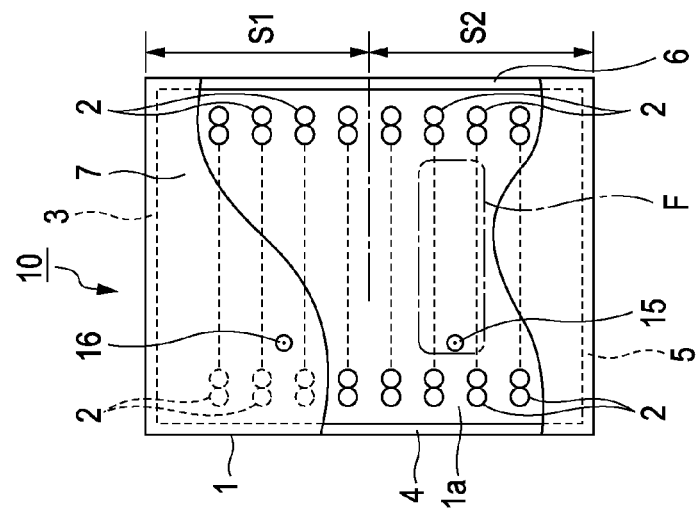
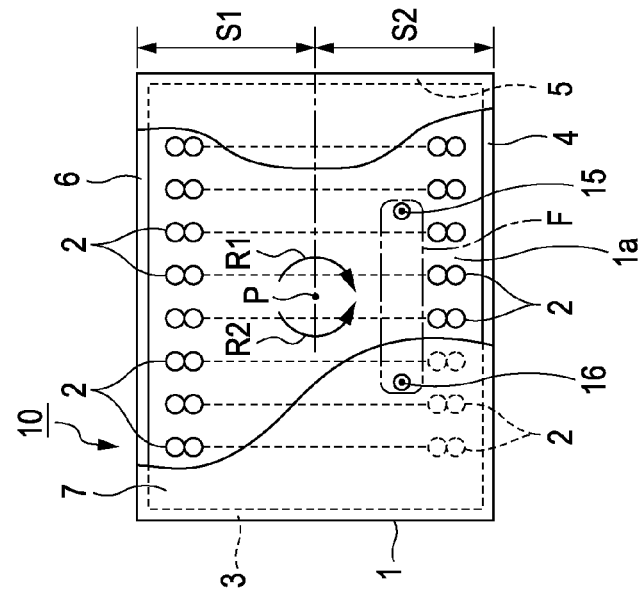

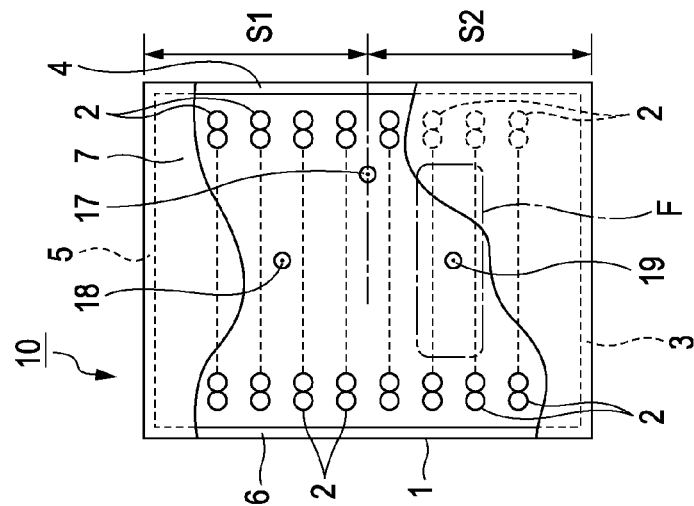
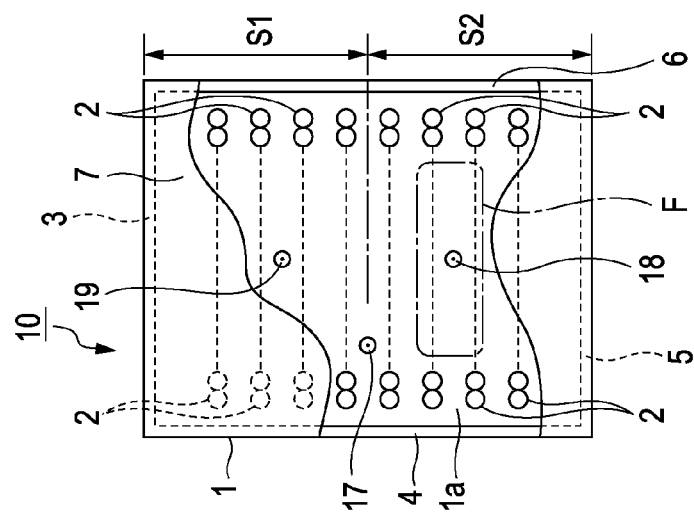
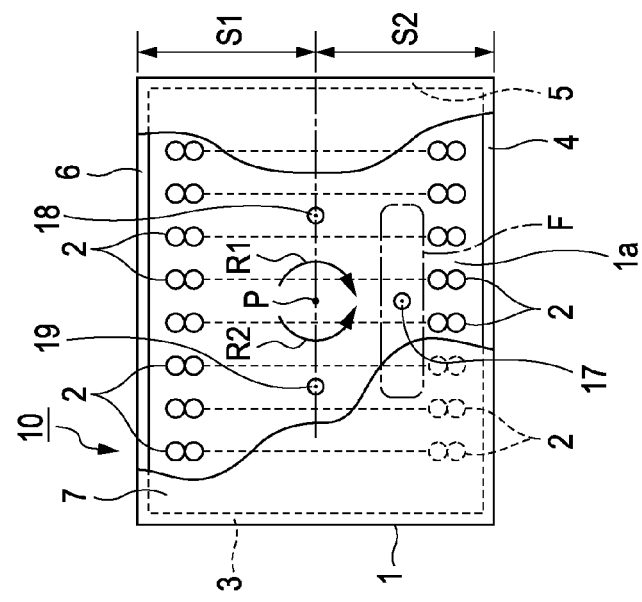

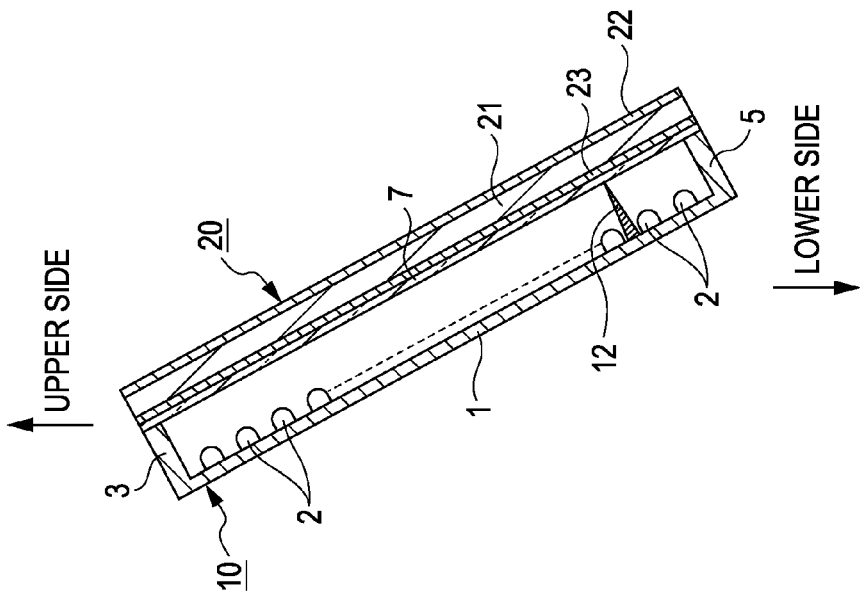
FIG. 17A (REFERENCE POSITION: R0)
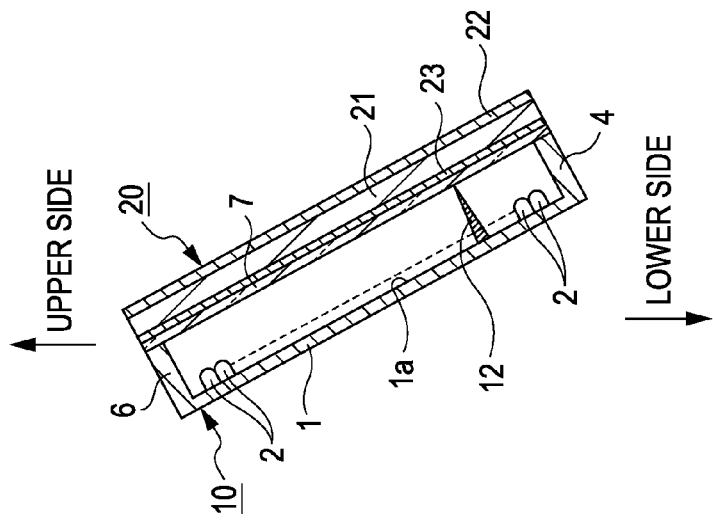
FIG. 17B (FIRST ROTATION POSITION: R1)

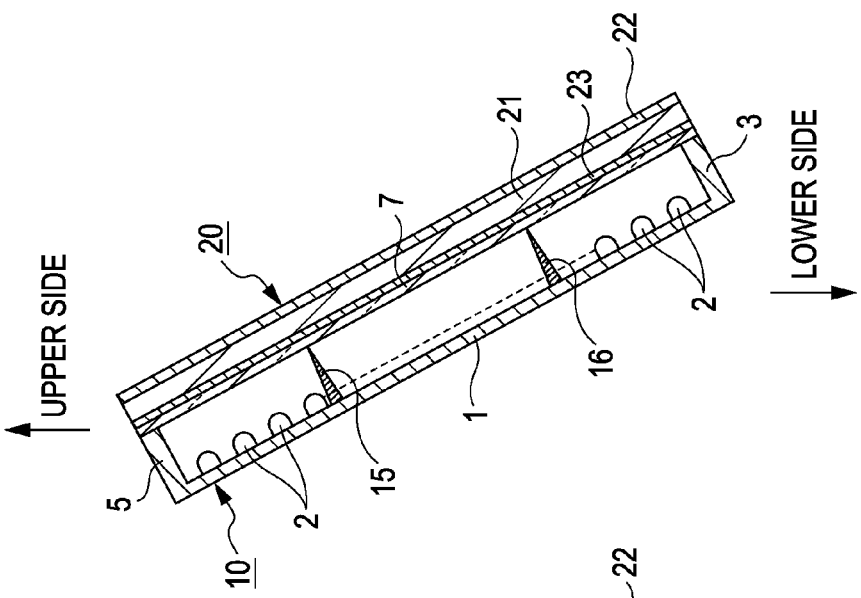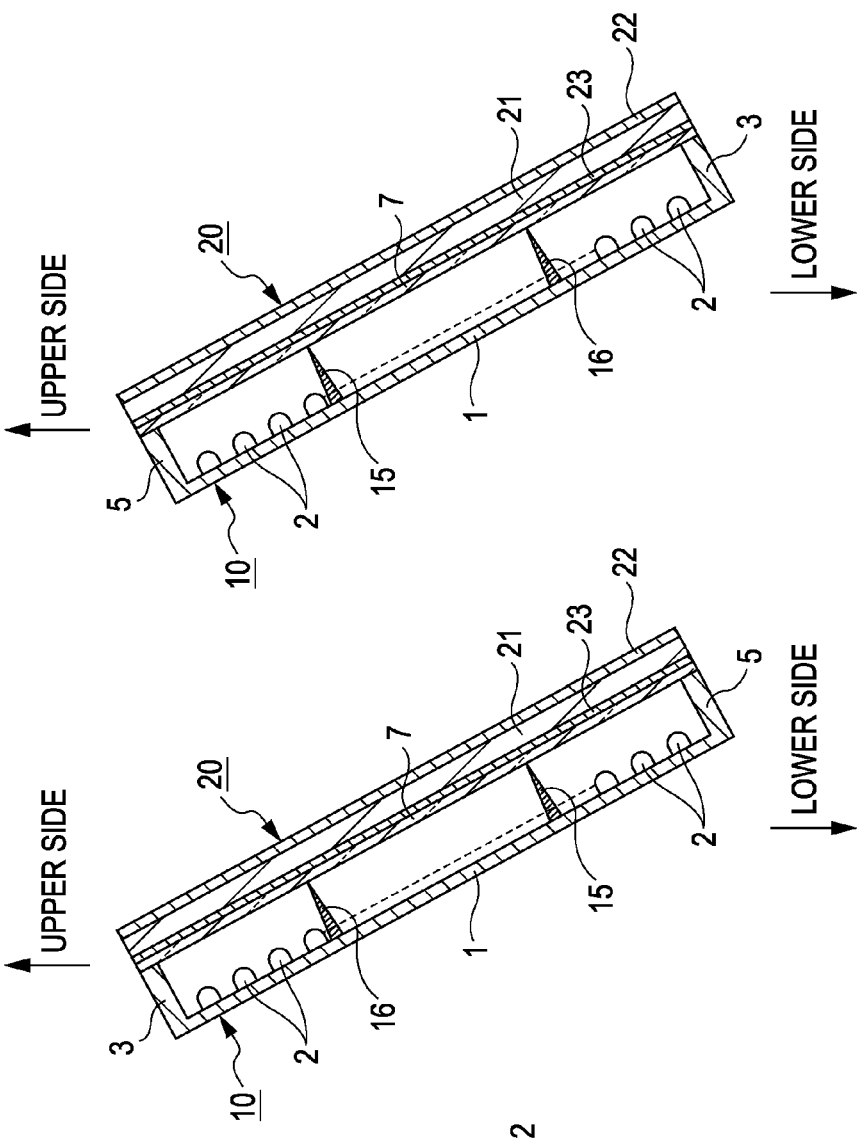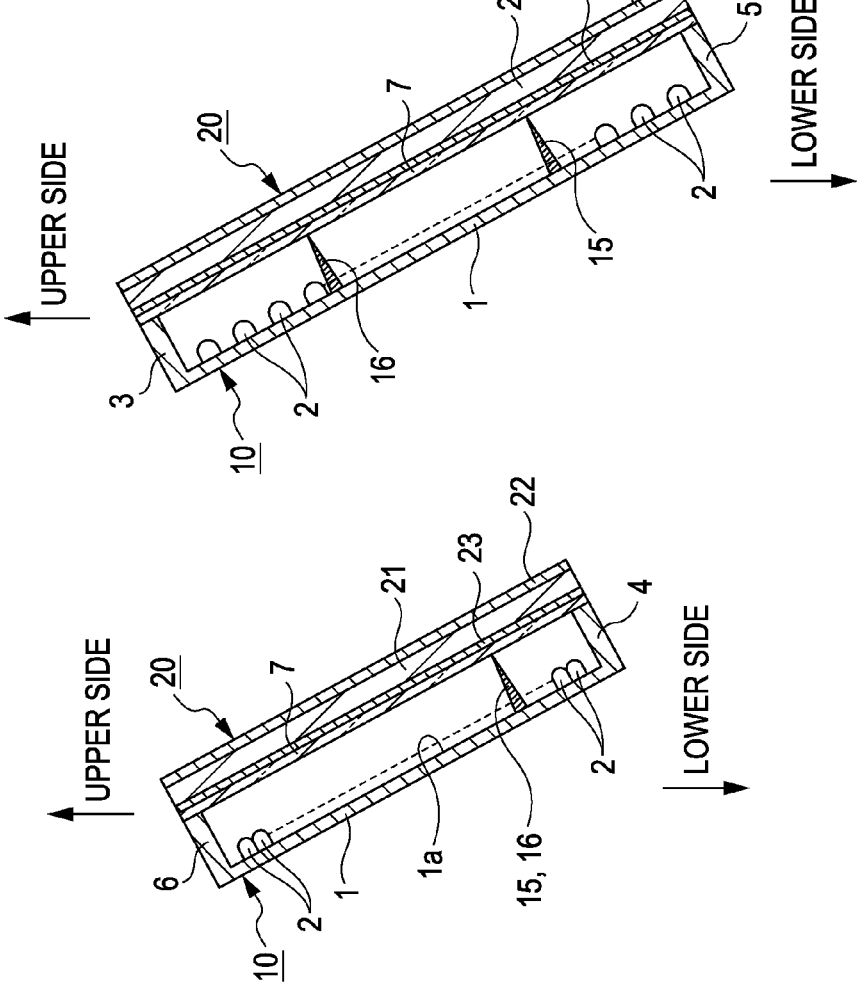

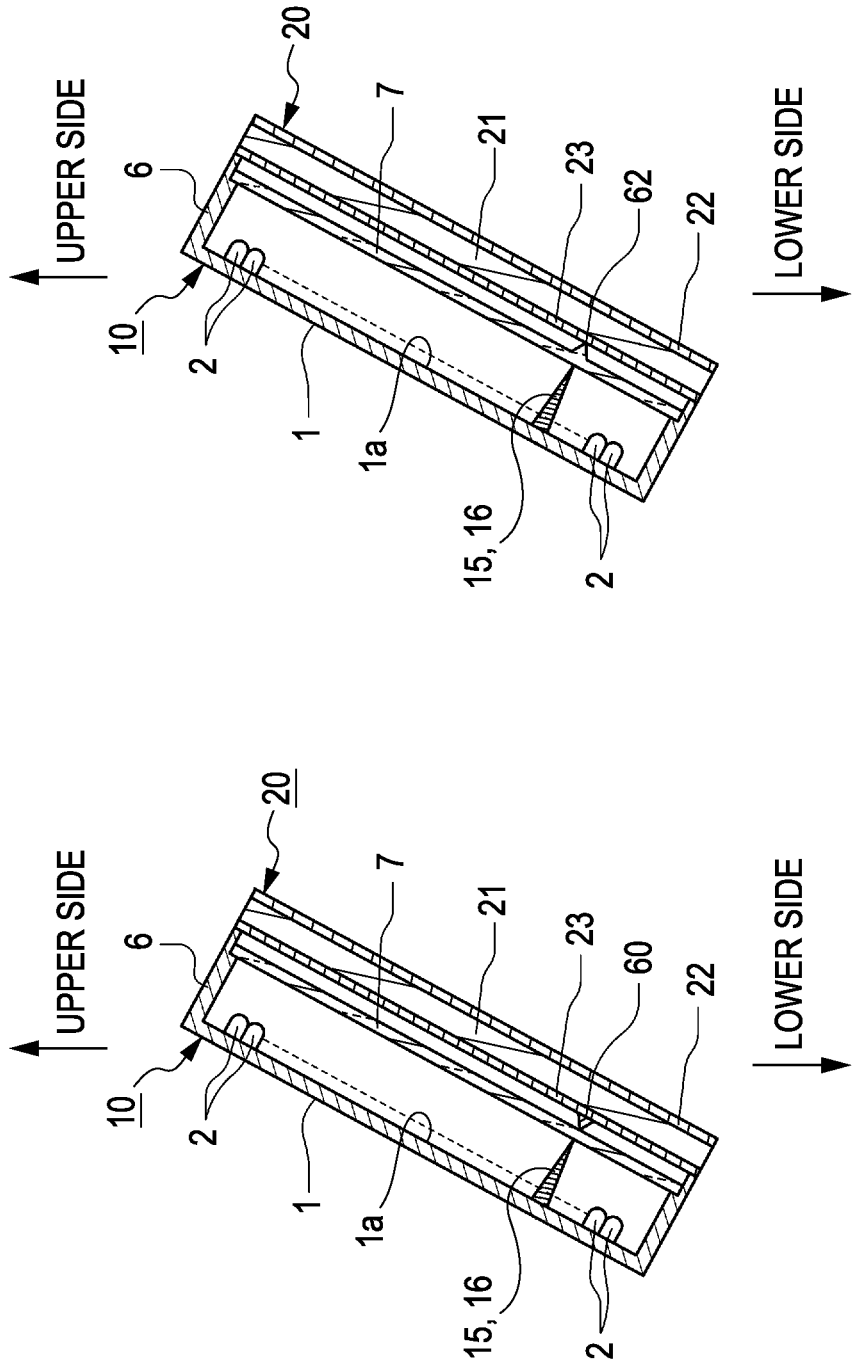

ELECTRONIC APPARATUS

The present application is a divisional of U.S. application Ser. No. 12/505,021, filed Jul. 17, 2007. The entire disclosure of Japanese Patent Application Nos: 2008-198374, filed Jul. 31, 2008 and 2009-102732, filed Apr. 21, 2009 are expressly incorporated by reference herein.

BACKGROUND

1. Technical Field

The present invention relates to an electronic apparatus including an electro-optical device that uses a direct-below-type back light unit having a spacer that supports an optical member.

2. Related Art

Generally, liquid crystal display (LCD) devices include a display panel that displays an image and a back light unit that is arranged on a rear face of the display panel and irradiates light toward the display panel.

Recently, the size of the screens of the liquid crystal display devices that are commonly used as the display devices of personal computers and CAD apparatuses has increased. Accordingly, luminance that is not inferior to that of display devices using Braun tubes is required for the large-screen liquid crystal display devices.

The large-screen liquid crystal display devices are commonly used on a table, on the floor, or the like as a stationary-type device, and thus a decrease in the thickness of the liquid crystal display devices to the degree needed for a notebook computer is not required. However, in order to enhance the characteristic of the liquid crystal display devices, a decrease in thickness of an appropriate degree is required. Accordingly, as a display panel, a transmissive type is used, and as a back light unit, a direct-below-type back light unit in which a plurality of light sources are arranged right below the display panel is used.

The direct-below type back light unit is configured to emit uniform light from a plurality of light sources to a display panel by arranging the plurality of light sources formed of LEDs or the like on a bottom face of a casing in a predetermined pattern and arranging a large diffusing plate (optical member) that disperses light in an opening portion of the casing that is the emission area of the plurality of light sources.

Here, when the large-screen liquid crystal display device is vertically arranged, the large diffusing plate may be easily bent toward the bottom face of the casing under its own weight. Accordingly, technology for preventing flexure due to the weight of the diffusing plate by arranging a plurality of spacers that protrude from the bottom face of the casing on the diffusing plate so as to support the diffusing plate has been disclosed (for example, JP-A-2006-278077).

However, according to the technology disclosed in JP-A-2006-278077, the plurality of spacers is arranged uniformly on the entire area of the bottom face of the casing, and the spacers are arranged on the entire area of the bottom face of the diffusing plate to support the diffusing plate. Thus, a lot of spacers must be arranged on the bottom face, and accordingly, there is a problem from the viewpoint of the manufacturing cost of the back light unit.

In addition, when a lot of spacers are arranged on the bottom face, emission of light from the plurality of light sources that are arranged on the bottom face is blocked by the spacers. Accordingly, the optical characteristic of the back light unit may deteriorate.

SUMMARY

An advantage of some aspects of the invention is that it provides an electronic apparatus, which includes an electro-optical device using a bright back light unit with low power consumption, capable of decreasing the manufacturing cost by arranging a minimum number of spacers to support the optical member and improving the optical characteristic of the back light unit.

According to a first aspect of the invention, there is provided an electronic apparatus including: a back light unit that includes a light source, an optical member having a flat shape that is arranged so as to face the irradiation direction of the light of the light source, and a spacer that supports the optical member from the light source side and is arranged in a state in which a face of the optical member is arranged parallel to the direction of gravity or inclined with respect to the direction of gravity; and a display panel that is arranged so as to be superimposed on a face through which light is emitted from the optical member of the back light unit. In the back light unit, the number of spacers arranged in an upper half area of the face of the optical member with respect to the direction of gravity is configured to be smaller than that of the spacers arranged in a lower half area of the face of the optical member with respect to the direction of gravity.

According to the above-described electronic apparatus, the number of the spacers is decreased, and accordingly, the time required for the operation for arranging the spacers can be shortened. Therefore, the manufacturing cost of the back light unit can be decreased. In addition, many spacers are brought into contact with a lower half area of the face of the optical member with respect to the direction of gravity in which the flexural amount is increased, and accordingly, the flexure of the diffusing plate can be suppressed. Furthermore, the number of the spacers is decreased, and accordingly, light can be emitted toward the optical member without being blocked by the spacers and with increased light intensity and luminance. Accordingly, the optical characteristic of the light source can be improved.

In addition, according to the above-described electronic apparatus, the flexure of the optical member of the back light unit is suppressed, and thus, uniform light is emitted to the display panel. In addition, the number of the spacers arranged inside the back light unit is also decreased, and accordingly, the optical characteristic of the light source is improved. Therefore, high image-quality display can be performed with high luminance.

In the above-described electronic apparatus, the back light unit may be configured to arrange at least one spacer in the lower half area of the optical member.

In such a case, the manufacturing cost of the back light unit can be decreased, and the optical characteristic of the light source can be improved. In addition, the flexure of the optical member can be suppressed.

According to a second aspect of the invention, there is provided an electronic apparatus including: a back light unit that includes a light source, an optical member having a flat shape that is arranged so as to face the irradiation direction of the light of the light source, and a spacer that supports the optical member from the light source side and is arranged in a state in which a face of the optical member is arranged parallel to the direction of gravity or inclined with respect to the direction of gravity; and a display panel that is arranged so as to be superimposed on a face through which light is emitted from the optical member of the back light unit. The back light unit is formed so as to be freely rotatable to a reference position and in at least one direction between a clockwise direction and a counterclockwise direction from the reference position, and, in any reference position, a position rotated in the clockwise direction, and a position rotated in the counterclockwise direction, the number of the spacers arranged in an upper half area of the face of the optical member with respect to the direction of gravity is configured to be smaller than that of the spacers arranged in a lower half area of the face of the optical member with respect to the direction of gravity.

In addition, in the above-described electronic apparatus, in the back light units that can be freely rotated, it is preferable that the spacers arranged in the lower half area of the optical member are arranged in positions in which the flexural amount of the lower half area of the optical member is increased.

According to the above-described electronic apparatuses, the position of the optical member, of which the vertical position is changed by rotation and in which flexure can easily occur, is changed. However, there is at least one spacer that is brought into contact with the bottom face of the lower half area of the optical member located at the reference position, the first rotation position or the second rotation position, and accordingly, the flexure of the optical member can be suppressed.

In addition, according to the above-described electronic apparatuses, the flexure of the optical member of the back light unit located at the reference position, the first rotation position, and the second rotation position is suppressed, and accordingly, uniform light is emitted to the display panel. In addition, the number of the spacers arranged inside the back light unit is also decreased, and accordingly, the optical characteristic of the light source is improved. Therefore, high image-quality display can be performed with high luminance.

In addition, the above-described electronic apparatus may further include a support mechanism that supports the electronic apparatus, and the support mechanism may include a support post that arranges the back light unit to be parallel to the direction of gravity or to be inclined with respect to the direction of gravity.

In such a case, the display area of the display panel of the electro-optical device can be arranged to be parallel to the direction of gravity or inclined with respect to the direction of gravity in an easy manner.

In addition, in the above-described electronic apparatus, the support mechanism may further include a rotation mechanism that freely rotates the back light unit to a reference position and in at least one direction between the clockwise direction and the counterclockwise direction from the reference position.

In such a case, the display area of the display panel of the electro-optical device can be easily rotated to the reference position and in at least one direction between the clockwise direction and the counterclockwise direction from the reference position.

BRIEF DESCRIPTION OF THE DRAWINGS

The invention will be described with reference to the accompanying drawings, wherein like numbers reference like elements.

FIGS. 14A to 14C are diagrams showing the front face of the back light unit according to the sixth embodiment, viewed in the horizontal direction. FIG. 14A is a diagram showing a reference position, FIG. 14B is a diagram showing a first rotation position rotated clockwise by 90 degrees, and FIG. 14C is a diagram showing a second rotation position rotated counterclockwise by 90 degrees.

FIGS. 15A to 15C are diagrams showing a front face of a back light unit according to a seventh embodiment of the invention, viewed in the horizontal direction. FIG. 15A is a diagram showing a reference position, FIG. 15B is a diagram showing a first rotation position rotated clockwise by 90 degrees, and FIG. 15C is a diagram showing a second rotation position rotated counterclockwise by 90 degrees.

FIGS. 17A and 17B are side cross-sectional views of an electro-optical device according to a ninth embodiment of the invention. FIG. 17A is a side cross-sectional view showing a reference position, and FIG. 17B is a side cross-sectional view showing a first rotation position rotated clockwise by 90 degrees.

FIGS. 18A to 18C are side cross-sectional views of an electro-optical device according to a tenth embodiment of the invention. FIG. 18A is a side cross-sectional view showing a reference position, FIG. 18B is a side cross-sectional view showing a first rotation position rotated clockwise by 90 degrees, and FIG. 18C is a side cross-sectional view showing a second rotation position rotated counterclockwise by 90 degrees.

FIGS. 19A and 19B are side cross-sectional views showing electro-optical devices according to modified examples. FIG. 19A is a diagram showing an electro-optical device in which a spacer is disposed on a liquid crystal display panel side of a diffusing plate, and FIG. 19B is a diagram showing an electro-optical device in which a protrusion is disposed on the liquid crystal display panel side of the diffusing plate as the spacer.

FIG. 20A is a diagram showing a horizontal-type display (reference position) state, and FIG. 20B is a diagram showing a vertical-type display (first rotation position) state.

FIG. 21A is a diagram showing a state in which a thin-type large screen TV is leaning against a wall or the like, and FIGS. 21B and 21C are diagrams showing a state in which the thin-type large screen TV is hanging on the wall.

DESCRIPTION OF EXEMPLARY EMBODIMENTS

Hereinafter, preferred embodiments (hereinafter, referred to as embodiments) of the invention will be described in detail with reference to the accompanying drawings.

First Embodiment

Thin-type Large Screen TV

Hereinafter, a thin-type large screen TV as an electronic apparatus according a first embodiment of the invention will be described.

Figure 1:
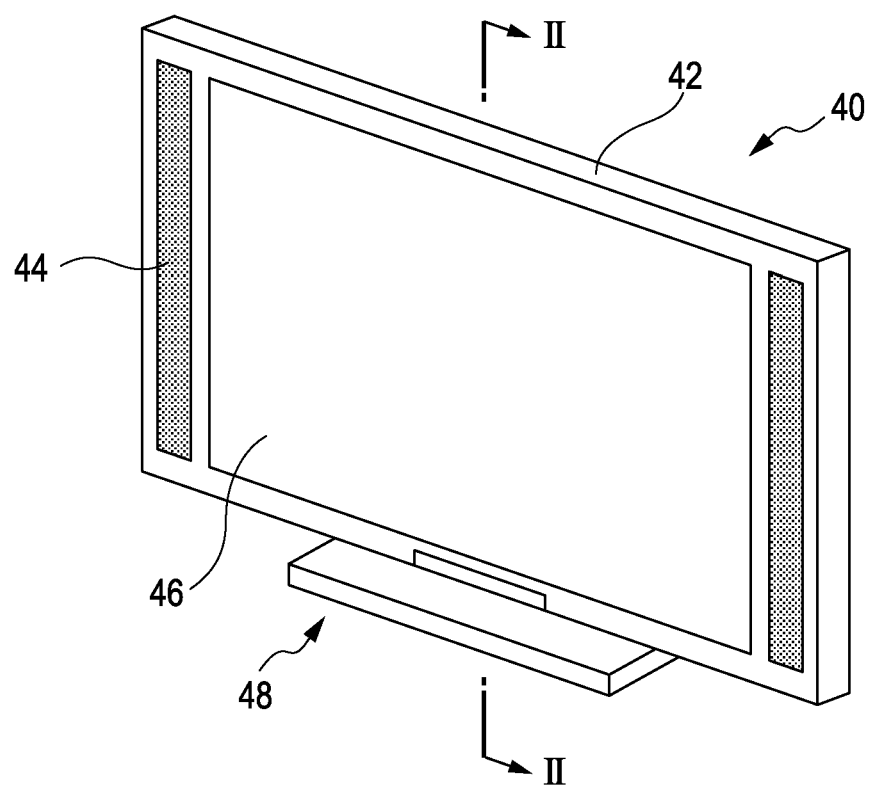
FIG. 1 is a perspective view of an electronic apparatus according to a first embodiment of the invention.
Figure 2:
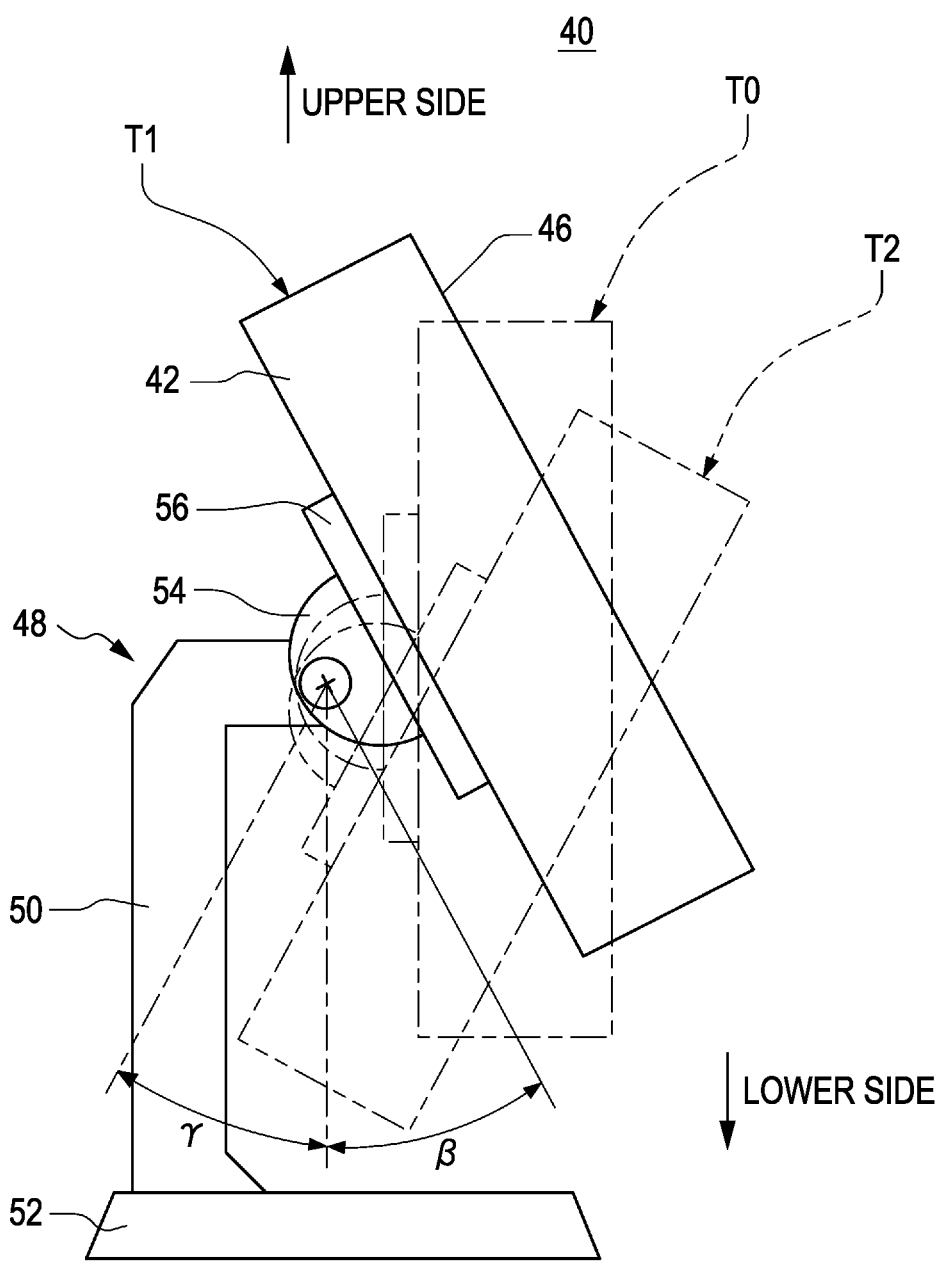
FIG. 2 is a cross-sectional view taken along line II-II shown in FIG. 1.
Figure 3:
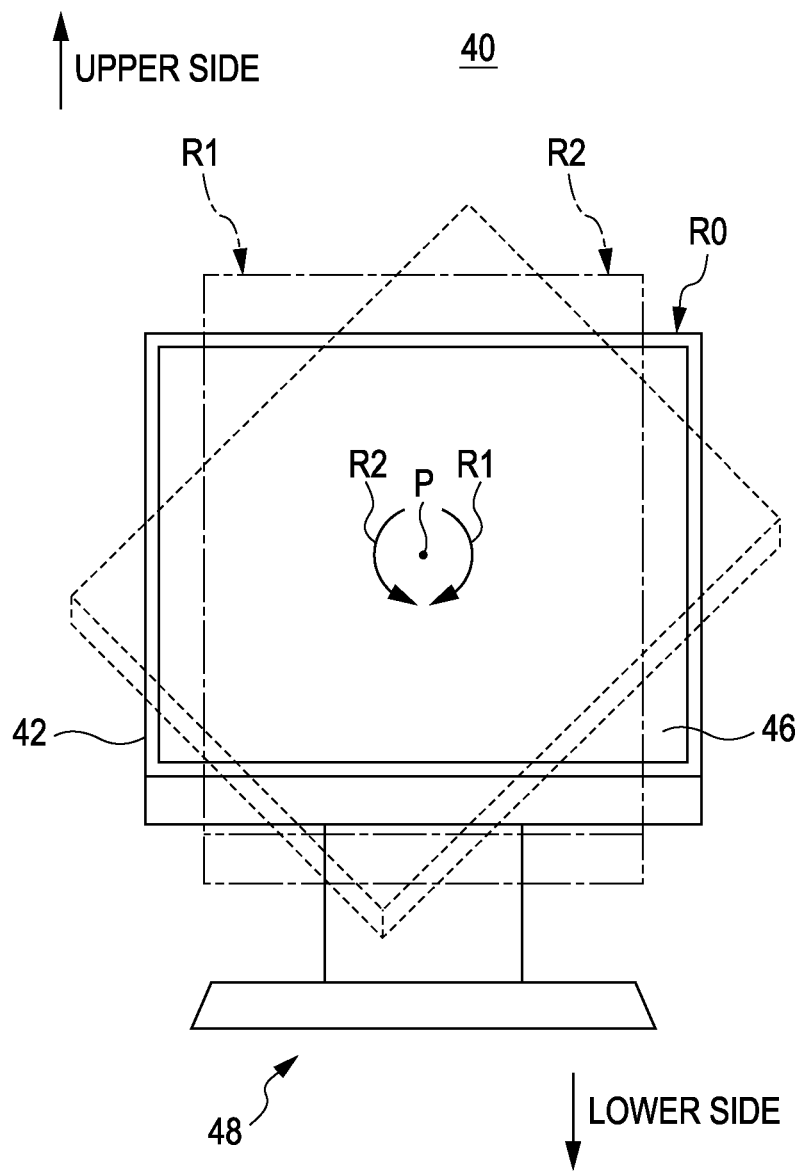
FIG. 3 is a diagram showing a front face of the electronic apparatus according to the first embodiment, viewed in the horizontal direction.

FIG. 1 is a perspective view of the thin-type large screen TV according to this embodiment. FIG. 2 is a cross-sectional view taken along line II-II shown in FIG. 1. FIG. 3 is a diagram showing a front face of the thin-type large screen TV according to this embodiment, viewed in the horizontal direction.

The thin-type large screen TV (electronic apparatus) 40, as shown in FIG. 1, includes a thin-type large screen TV main body 42, a voice outputting unit 44 such as a speaker, a display unit 46 for the thin-type large screen TV to which a liquid crystal display device to be described later is applied, and a support device 48 as a support post.

The display unit 46 according to this embodiment is a liquid crystal display device having a back light unit to be described later.

In the support device 48, as shown in FIG. 2, a stand support post 50 is vertically arranged in a support board 52 so as to be rotatable in the horizontal direction at any arbitrary angle within a predetermined angle range. In addition, in the top end of this stand support post 50, a first rotation mechanism 54 that supports the thin-type large screen TV main body 42 at the rear face is arranged. This first rotation mechanism 54 supports the display unit 46 such that the angle of the display unit 46 can be adjusted to any arbitrary position within a predetermined angle range in the vertical direction with respect to the direction of gravity and in the horizontal direction with respect to a direction that intersects the direction of gravity. In addition, the display unit 46 is configured to be able to be rotated upward by a predetermined tilt angle β and be rotated downward by a predetermined tilt angle γ. In the thin-type large-screen TV 40, a display area of the display unit 46 can be set to be parallel to the direction of gravity or to be inclined with respect to the direction of gravity by the first rotation mechanism 54. Thus, the thin-type large screen TV can be switched to a state T1 in which the display area of the display unit 46 is inclined upward with respect to the direction of gravity or a state T2 in which the display area of the display unit 46 is inclined downward with respect to the direction of gravity. In addition, a state T0 is a state in which the display area of the display unit 46 is parallel to the direction of gravity.

In addition, in the support device 48, a second rotation mechanism 56 that supports the thin-type large screen TV main body 42 at the rear face is arranged in the top end of the stand support post 50. The second rotation mechanism 56, as shown in FIG. 3, supports the thin-type large screen TV main body 42 such that the display unit 46 can be adjusted to be rotated around the center position of the display unit 46 to any arbitrary position within a predetermined rotation angle range. In the thin-type large screen TV 40, the display unit 46 can be rotated around the center position P of the display unit 46 by ±90 degrees by the second rotation mechanism 56. The thin-type large screen TV 40 can be switched to a reference position R0, a first rotation position R1 that is rotated clockwise by 90 degrees, and a second rotation position R2 rotated counterclockwise by 90 degrees, which are shown in FIG. 3.

Hereinafter, the back light unit and the liquid crystal display device will be described in detail.

Second Embodiment

Back Light Unit

Figure 4:
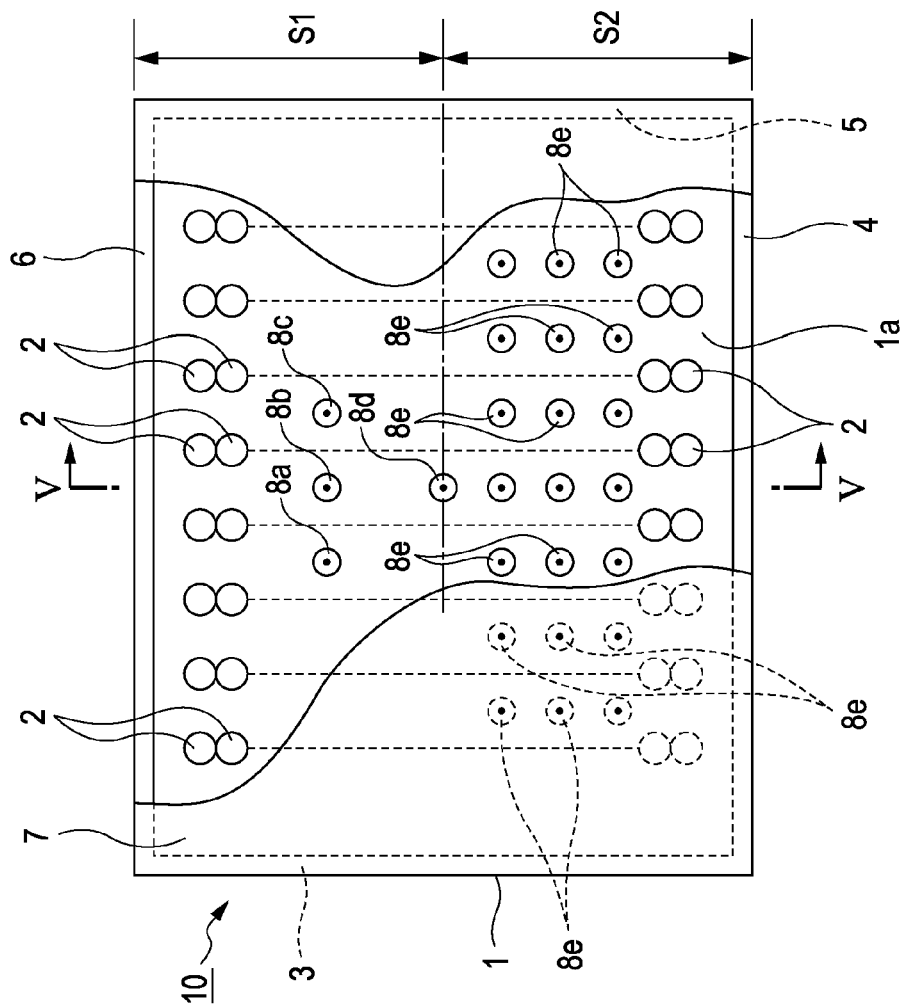
FIG. 4 is a diagram showing a front face of a back light unit according to a second embodiment of the invention, viewed in the horizontal direction.
Figure 5:
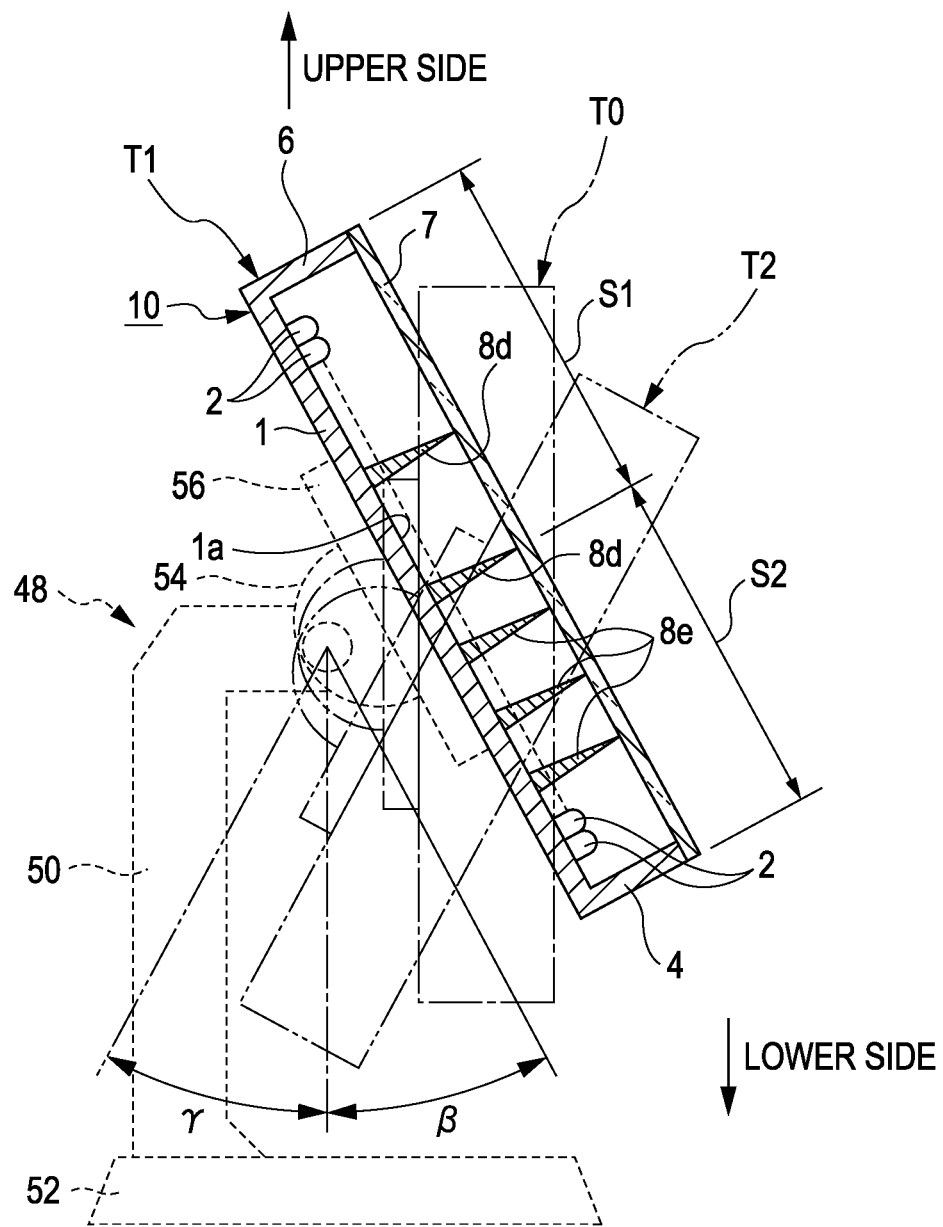
FIG. 5 is a cross-sectional view taken along line V-V shown in FIG. 4.
Figure 6:
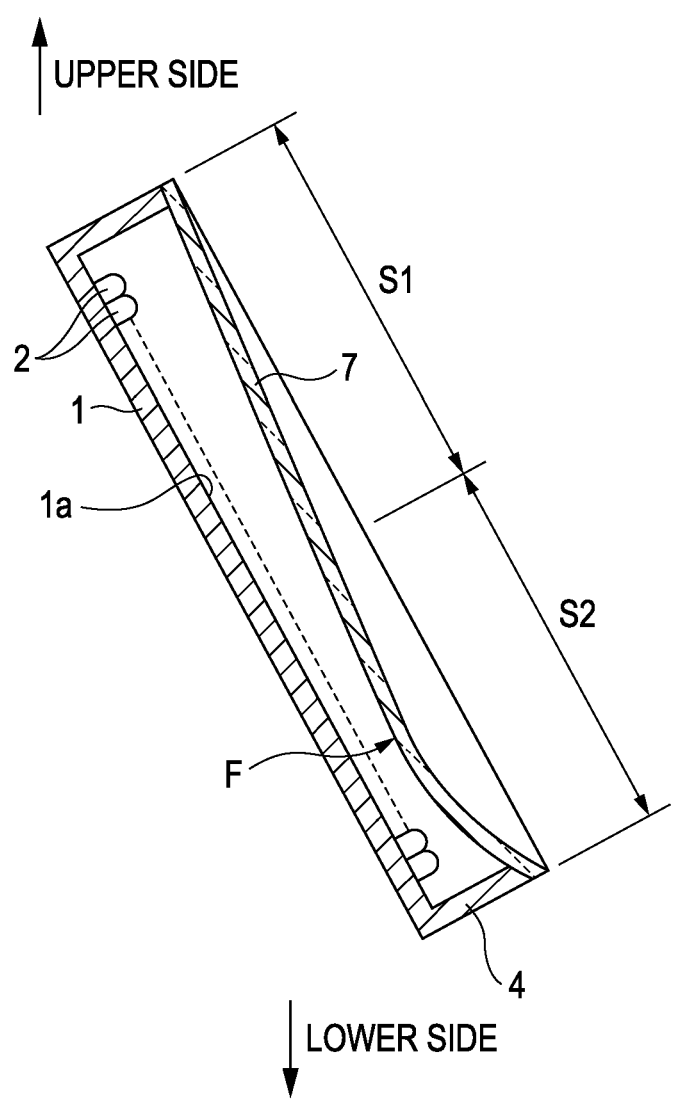
FIG. 6 is a cross-sectional view showing a state in which an optical member of a flat shape is bent without arranging any spacers.

FIG. 4 is a diagram showing a front face of a back light unit according to a second embodiment of the invention, viewed in the horizontal direction. FIG. 5 is a cross-sectional view taken along line V-V shown in FIG. 4 and is a diagram showing a back light unit that is disposed to be parallel to the direction of gravity or is inclined upward or downward with respect to the direction of gravity. FIG. 6 is a diagram showing a back light unit that is inclined upward with respect to the direction of gravity without arranging any spacers.

The back light unit 10 according to this embodiment, as shown in FIG. 4, includes a casing 1 of a bottomed-box shape, a plurality of light sources 2 arranged in a plurality of rows on a bottom face 1a of the casing 1 with a predetermined gap interposed therebetween, a diffusion plate (optical member) 7 that is fixed to a plurality of side walls 3 to 6 that are vertically arranged from an edge portion of the casing 1 and which closes an opening portion that is partitioned and formed by the side walls 3 to 6, and a plurality of spacers 8a to 8e that is arranged on the bottom face 1a in a position in which the light sources 2 are not arranged and which supports the diffusion plate 7 from the light source 2 side.

The back light unit 10 according to this embodiment, as shown in FIG. 5, is used in a state in which the face of the diffusion plate 7 is disposed to be parallel to the direction of gravity or inclined upward or downward with respect to the direction of gravity. The plurality of spacers 8a to 8e arranged on the bottom face 1a supports the diffusion plate 7 from the light source 2 side, and accordingly the flexural deformation of the diffusion plate 7 is suppressed.

Here, the diffusion plate 7 that is not supported by any spacer, as shown in FIG. 6, is bent toward the bottom face 1a due to the weight of the diffusing plate 7. Thus, when the back light unit is inclined upward with respect to the direction of gravity, the flexural amount of a lower half area S2 with respect to the gravity direction of the face of the diffusion plate 7 is increased.

On the contrary, according to the back light unit 10 of this embodiment, the number of spacers 8a to 8c that are arranged in the upper half area S1 of the face of the diffusing plate 7 with respect to the direction of gravity is smaller than that of a plurality of spacers 8e that is arranged in the lower half area S2 of the face of the diffusing plate 7 with respect to the direction of gravity. Here, the substrate of this embodiment corresponds to the bottom face 1a, and the optical member corresponds to the diffusing plate 7. According to this embodiment, in the back light unit 10 that is arranged to be parallel to the direction of gravity or inclined upward or downward with respect to the direction of gravity, a plurality of spacers is not arranged on the entire bottom face of the casing uniformly, unlike a typical device, and the number of the spacers 8a to 8c arranged in the upper half area S1 of the diffusing plate 7 is configured to be smaller than that of the plurality of the spacers 8e arranged in the lower half area S2 of the diffusing plate 7. Accordingly, the total number of the spacers 8a to 8e that are arranged on the bottom face 1a of the casing 1 is decreased. Therefore, the time required for the operation for arranging the spacers 8a to 8e can be shortened, and whereby the manufacturing cost of the back light unit 10 can be reduced.

In addition, according to the back light unit 10 of this embodiment, more spacers 8e are arranged in the lower half area S2 of the diffusing plate 7 in which the amount of flexure is increased. Accordingly, the flexure of the diffusing plate 7 can be suppressed.

In addition, by decreasing the number of the spacers 8a to 8e arranged on the bottom face 1a of the casing 1, the plurality of the light sources 2 arranged in a plurality of rows on the bottom face 1a can emit light toward the diffusion plate 7 with the intensity and the luminance of the light increased without being blocked by the spacers 8a to 8e. Accordingly, the optical characteristic of the light source is improved, and whereby the back light unit 10 that is bright with low power consumption can be provided.

The plurality of the spacers 8a to 8e that supports the diffusing plate 7 from the light source 2 side may be fixed to the diffusion plate 7 by using an adhesive agent or the like.

Third Embodiment

Back Light Unit

Figure 7:
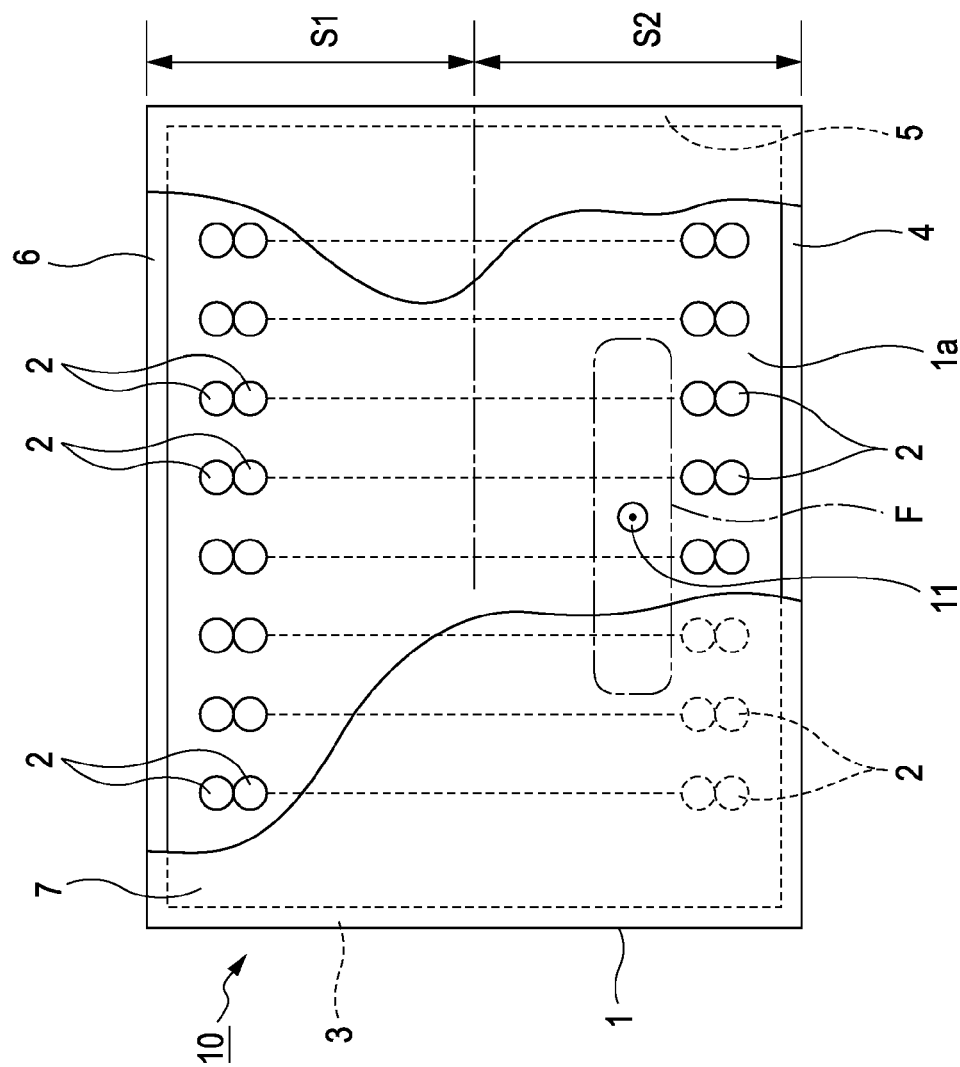
FIG. 7 is a diagram showing a front face of a back light unit according to a third embodiment of the invention, viewed in the horizontal direction.

FIG. 7 is a diagram showing a front face of a back light unit according to a third embodiment of the invention, viewed in the horizontal direction.

According to the back light unit 10 of this embodiment which is arranged to be inclined upward with respect to the direction of gravity, one spacer 11 is arranged on the bottom face 1a in a position F in which the flexural amount of the lower half area S2 of the face of the diffusing plate 7 with respect to the direction of gravity is increased.

According to this embodiment, the number of spacers is decreased greatly (one spacer 11), and accordingly, the time required for the operation for arranging the spacer 11 can be shortened greatly, and accordingly the manufacturing cost of the back light unit 10 can be reduced further.

In addition, the flexure of the diffusing plate 7 can be suppressed since the spacer 11 is arranged in the position F in which the flexural amount of the lower half area S2 of the diffusing plate 7 is increased.

In addition, by decreasing the number of the spacer 11, the optical characteristic of the light source 2 can be improved further.

In this embodiment, one spacer 11 is arranged in the position F in which the flexural amount of the lower half area S2 of the diffusing plate 7 is the maximum. However, two or more spacers may be arranged near the above-described position. In addition, a plurality of spacers may be arranged in the lower half area S2 of the face of the diffusing plate 7 and the upper half area S1 with respect to the direction of gravity. However, in such a case, the number of spacers arranged in the upper half area S1 is configured to be smaller than that of the spacers arranged in the lower half area S2.

Fourth Embodiment

Back Light Unit

Figure 8:
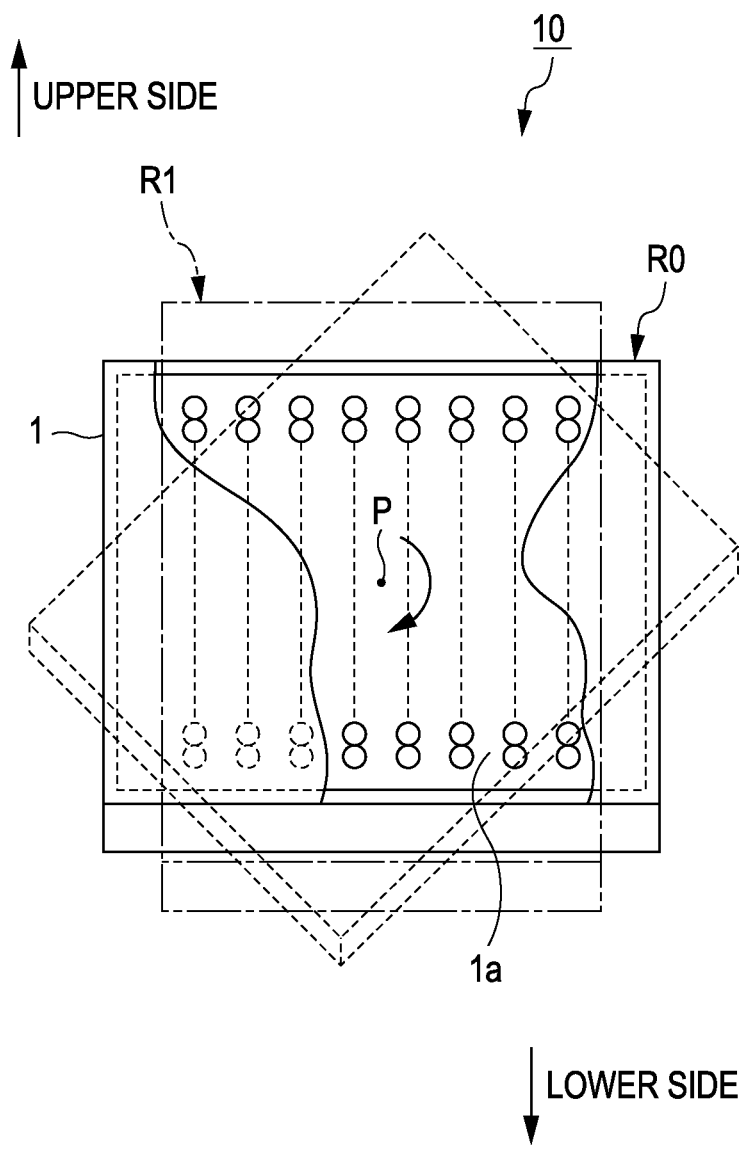
FIG. 8 is a diagram showing a front face of a back light unit according to a fourth embodiment of the invention, viewed in the horizontal direction.
Figure 9:
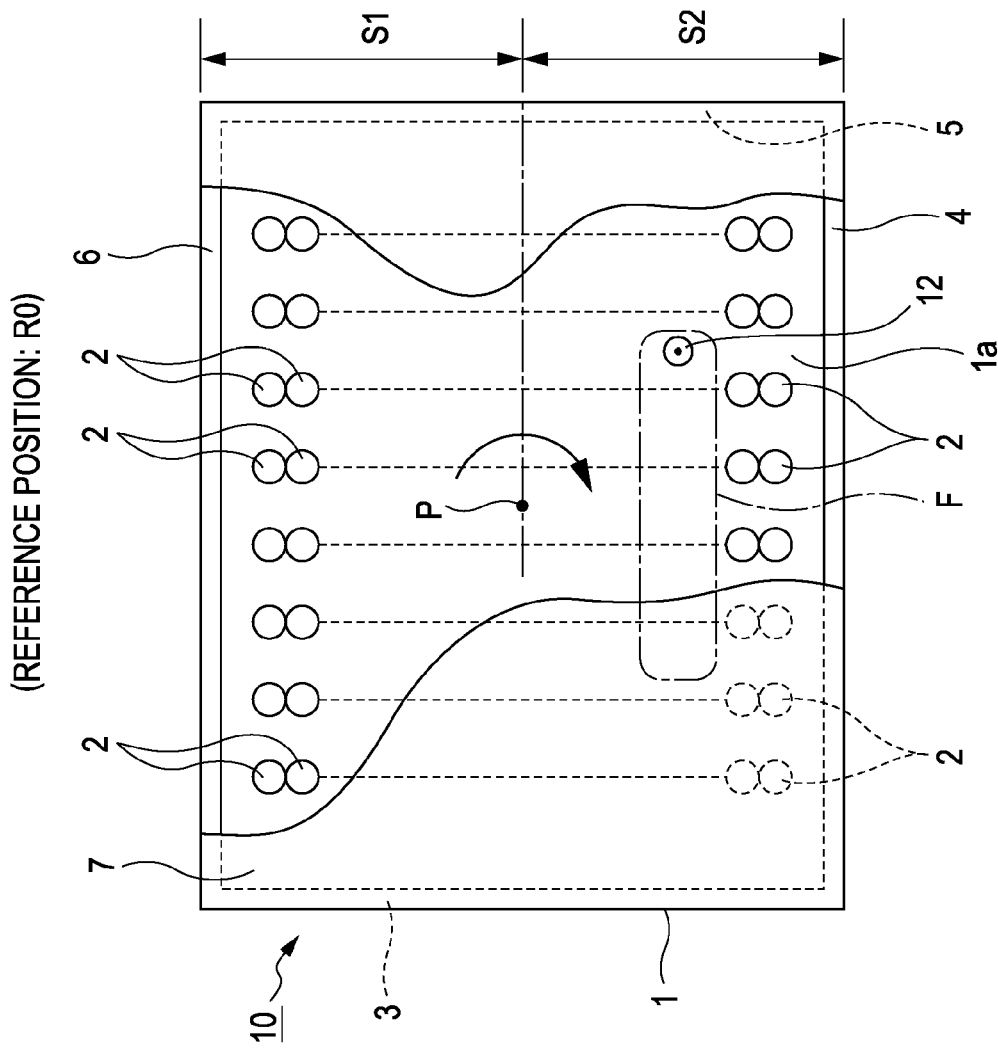
FIG. 9 is a diagram showing the front face of the back light unit arranged in a reference position according to the fourth embodiment, viewed in the horizontal direction.
Figure 10:
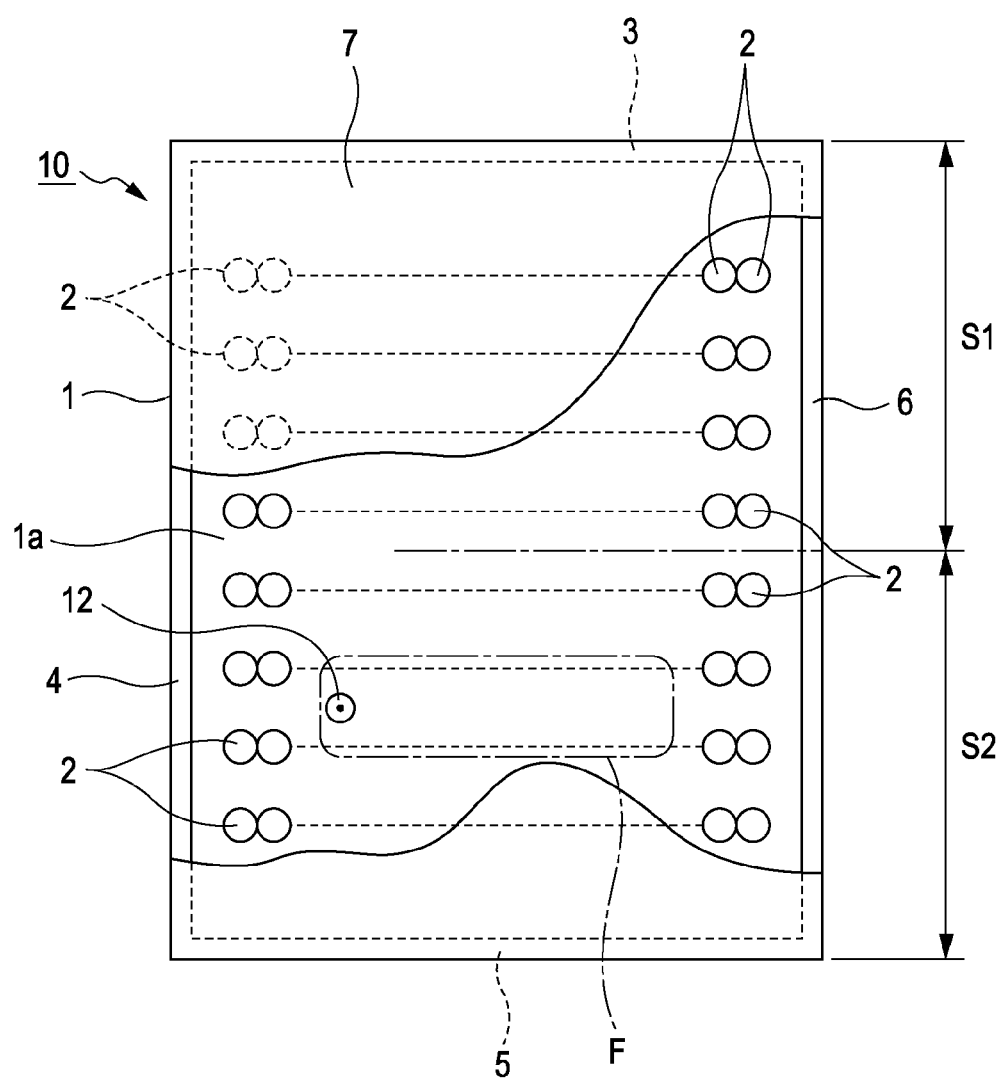
FIG. 10 is a diagram showing the front face of the back light unit arranged in a first rotation position according to the fourth embodiment, viewed in the horizontal direction.

FIG. 8 is a diagram showing a front face of a back light unit according to a fourth embodiment of the invention, viewed in the horizontal direction. FIG. 9 is a diagram showing the front face of the back light unit arranged in a reference position according to this embodiment, viewed in the horizontal direction. FIG. 10 is a diagram showing the front face of the back light unit arranged in a first rotation position according to this embodiment, viewed in the horizontal direction.

The back light unit 10 according to this embodiment which is arranged to be inclined upward with respect to the direction of gravity, as shown in FIG. 8, can be rotated clockwise by 90 degrees around the center position P of the bottom face 1a of the casing 1. The position shown in FIG. 9 is assumed to be the reference position R0, and the position shown in FIG. 10 is assumed to be the first rotation position R1 rotated clockwise by 90 degrees.

According to this embodiment, in the reference position R0 shown in FIG. 9, a spacer 12 is arranged on the bottom face 1a in a position F in which the flexural amount of the lower half area S2 of the face of the diffusing plate 7 with respect to the direction of gravity is increased.

This spacer 12 is arranged in the position F in which the flexural amount of the lower half area S2 of the diffusing plate 7 is increased even when the back light unit 10 is rotated to the first rotation position R1 shown in FIG. 10. According to this embodiment, the number of spacers is decreased greatly (one spacer 12), compared to a typical device. Accordingly, the time required for the operation for arranging the spacer 12 can be shortened greatly, and accordingly the manufacturing cost of the back light unit 10 can be reduced.

In addition, since the spacer 12 suppresses both the flexure of the diffusing plate 7 located at the reference position R0 and the flexure of the diffusing plate 7 located at the first rotation position R1, the flexure of the diffusing plate 7 can be suppressed even for a case where the back light unit 10 is rotated by 90 degrees.

In addition, by decreasing the number of the spacers, the optical characteristic of the light source 2 can be improved.

In this embodiment, one spacer 12 is arranged in the position F in which the flexural amount of the lower half area S2 of the diffusing plate 7 located at the reference position R0 or the first rotation position R1 is the maximum. However, two or more spacers may be arranged near the above-described position. In addition, a plurality of spacers may be arranged in the lower half area S2 of the face of the diffusing plate 7, which is located at the reference position R0 or the first rotation position R1, and the upper half area S1 with respect to the direction of gravity. However, in such a case, the number of spacers arranged in the upper half area S1 is configured to be smaller than that of the spacers arranged in the lower half area S2.

Fifth Embodiment

Back Light Unit

Figure 11:
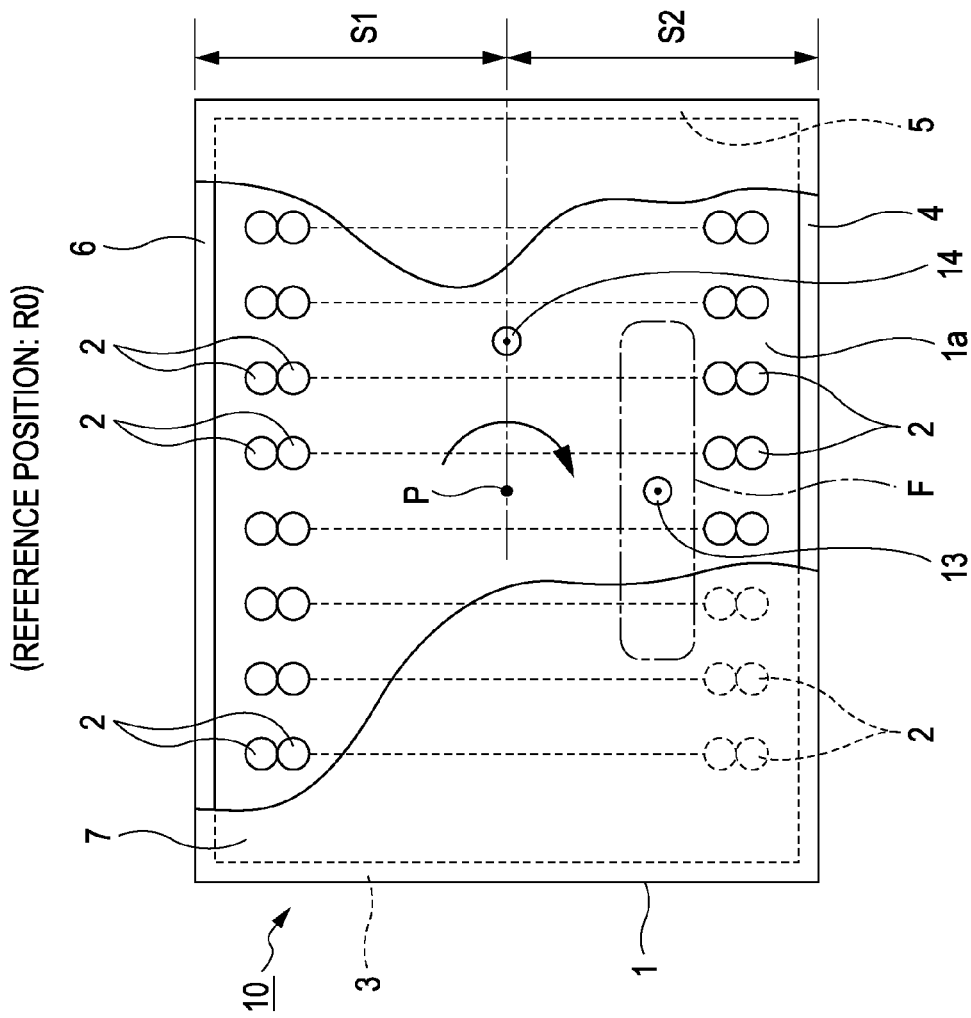
FIG. 11 is a diagram showing a front face of a back light unit according to a fifth embodiment of the invention which is arranged in a reference position, viewed in the horizontal direction.
Figure 12:
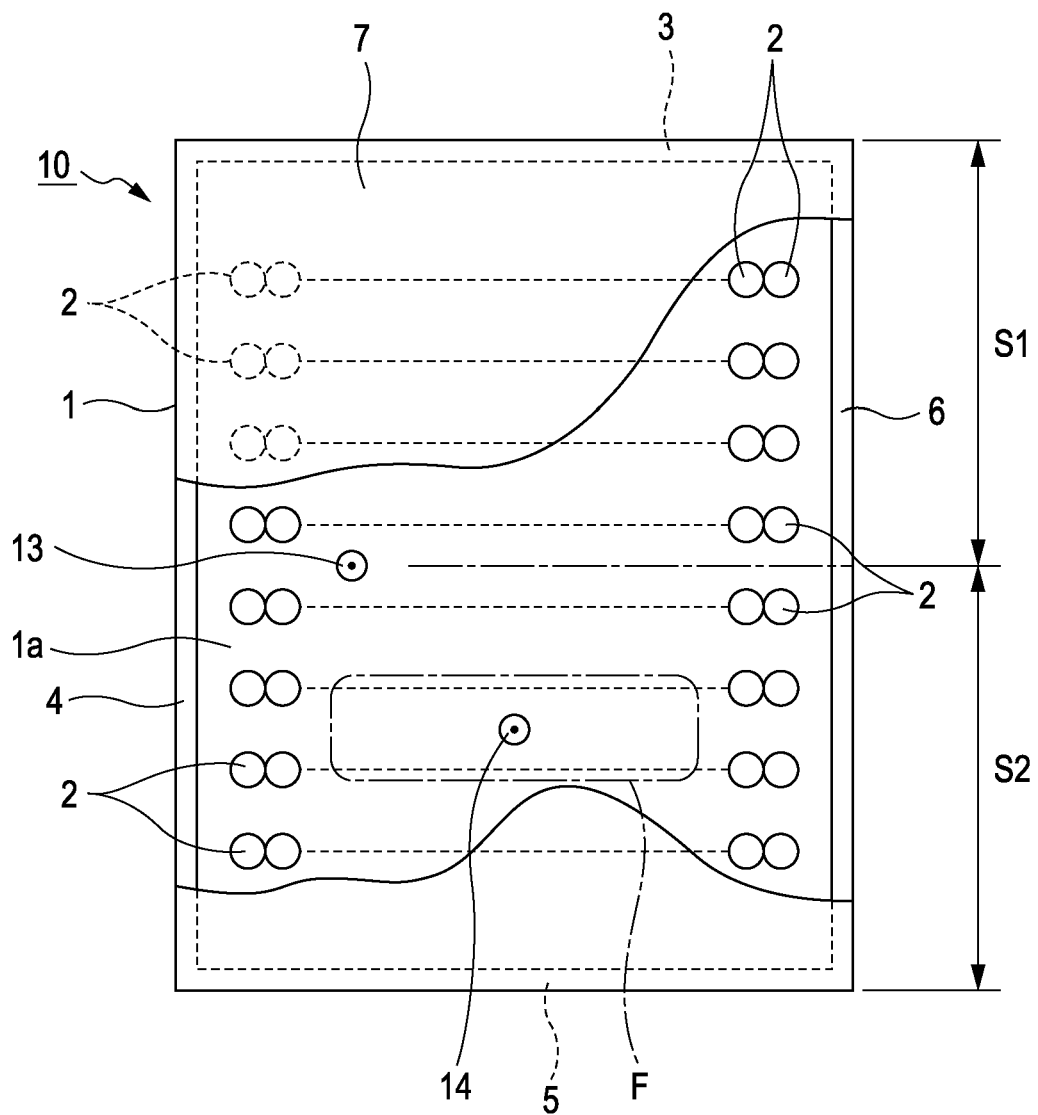
FIG. 12 is a diagram showing the front face of the back light unit arranged in a first rotation position according to the fifth embodiment, viewed in the horizontal direction.

FIG. 11 is a diagram showing a front face of a back light unit according to a fifth embodiment of the invention which is arranged in a reference position, viewed in the horizontal direction. FIG. 12 is a diagram showing the front face of the back light unit arranged in a first rotation position according to this embodiment, viewed in the horizontal direction.

The back light unit 10 according to this embodiment which is arranged to be inclined upward with respect to the direction of gravity, similar to the fourth embodiment, can be rotated clockwise by 90 degrees around the center position P of the bottom face 1a of the casing 1. The position shown in FIG. 11 is assumed to be the reference position R0, and the position shown in FIG. 12 is assumed to be the first rotation position R1 rotated clockwise by 90 degrees.

According to this embodiment, in the reference position R0 shown in FIG. 9, a first spacer 13 is arranged on the bottom face 1a in a position F in which the flexural amount of the lower half area S2 of the face of the diffusing plate 7 with respect to the direction of gravity is increased. In addition, a second spacer 14 is arranged on the bottom face 1a in a position located to the right of the first spacer 13 in FIG. 11.

The second spacer 14 is arranged in the position F in which the flexural amount of the lower half area S2 of the diffusing plate 7 is increased for a case where the back light unit 10 is rotated to the first rotation position R1 shown in FIG. 12. According to this embodiment, the number of the spacers is decreased greatly (two spacers 13 and 14), compared to a typical device. Accordingly, the time required for the operation for arranging the spacers 13 and 14 can be shortened greatly, and accordingly the manufacturing cost of the back light unit 10 can be reduced.

In addition, the first spacer 13 suppresses the flexure of the diffusing plate 7 located at the reference position R0, and the second spacer 14 suppresses the flexure of the diffusing plate 7 located at the first rotation position R1. Accordingly, the flexure of the diffusing plate 7 can be suppressed even for a case where the back light unit 10 is rotated.

In addition, by decreasing the number of the spacers, the optical characteristic of the light source 2 can be improved.

In this embodiment, one of the first and second spacers 13 and 14 is arranged in the position F in which the flexural amount of the lower half area S2 of the diffusing plate 7 located at the reference position R0 or the first rotation position R1 is increased. However, two or more spacers may be arranged in the above-described positions. In addition, a plurality of spacers may be arranged in the lower half area S2 of the face of the diffusing plate 7, which is located at the reference position R0 or the first rotation position R1, and the upper half area S1 with respect to the direction of gravity. However, in such a case, the number of spacers arranged in the upper half area S1 is configured to be smaller than that of the spacers arranged in the lower half area S2.

Sixth Embodiment

Back Light Unit

FIG. 13 and FIGS. 14A to 14C are diagrams showing a front face of a back light unit according to a sixth embodiment of the invention, viewed in the horizontal direction.

Figure 13:
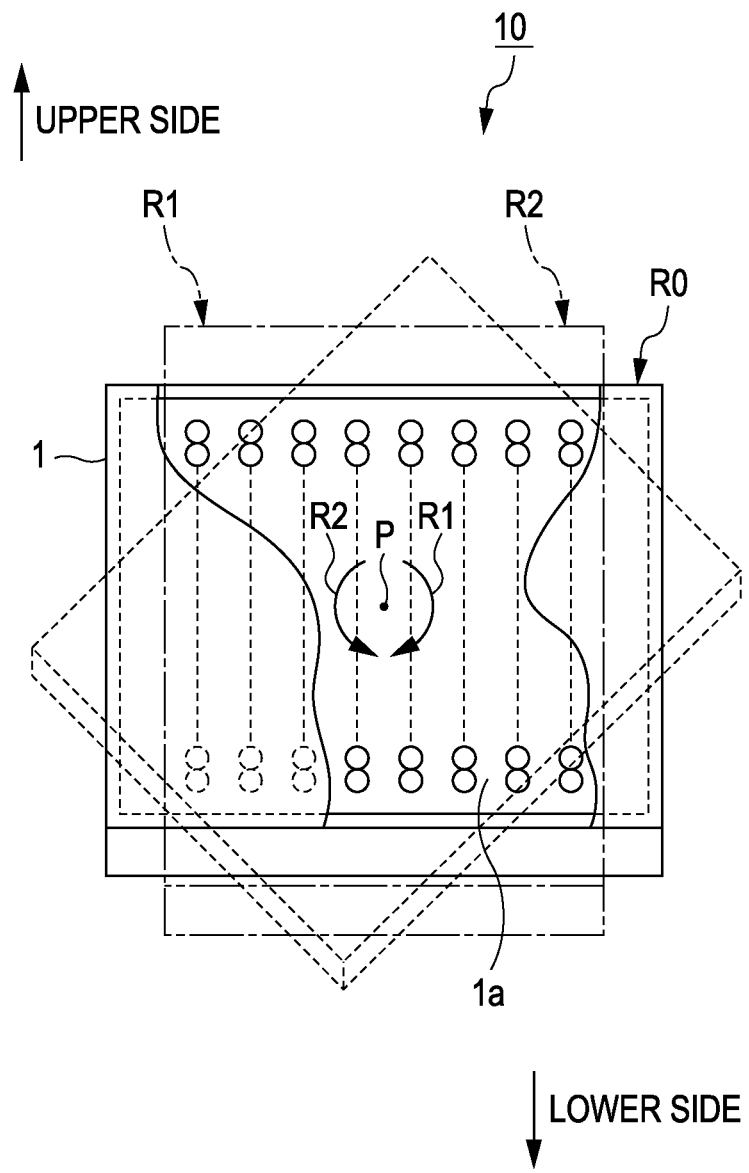
FIG. 13 is a diagram showing a front face of a back light unit according to a sixth embodiment of the invention, viewed in the horizontal direction.

The back light unit 10 according to this embodiment which is arranged to be inclined upward with respect to the direction of gravity, as shown in FIG. 13, can be rotated clockwise or counterclockwise by 90 degrees around the center position P of the bottom face 1a of the casing 1. The position shown in FIG. 14A is assumed to be a reference position R0, the position shown in FIG. 14B is assumed to be a first rotation position R1 rotated clockwise by 90 degrees, and the position shown in FIG. 14C is assumed to be a second rotation position R2 rotated counterclockwise by 90 degrees.

According to this embodiment, in the reference position R0 shown in FIG. 14A, a first spacer 15 and a second spacer 16 are arranged on the bottom face 1a in a position F in which the flexural amount of the lower half area S2 of the face of the diffusing plate 7 with respect to the direction of gravity is increased.

In addition, the first spacer 15 is arranged in the position F in which the flexural amount of the lower half area S2 of the diffusing plate 7 is increased for a case where the back light unit 10 is rotated to the first rotation position R1 shown in FIG. 14B.

In addition, the second spacer 16 is arranged in the position F in which the flexural amount of the lower half area S2 of the diffusing plate 7 is increased for a case where the back light unit 10 is rotated to the second rotation position R2 shown in FIG. 14C.

According to this embodiment, the number of the spacers is decreased greatly (two spacers 15 and 16), compared to a typical device. Accordingly, the time required for the operation for arranging the spacers 15 and 16 can be shortened greatly, and accordingly the manufacturing cost of the back light unit 10 can be reduced.

In addition, the first and second spacers 15 and 16 suppress the flexure of the diffusing plate 7 located at the reference position R0, the first spacer 15 suppresses the flexure of the diffusing plate 7 located at the first rotation position R1, and the second spacer 16 suppresses the flexure of the diffusing plate 7 located at the second rotation position R2. Accordingly, the flexure of the diffusing plate 7 can be suppressed even for a case where the back light unit 10 is rotated clockwise or counterclockwise by 90 degrees. In addition, by decreasing the number of the spacers, the optical characteristic of the light source 2 can be improved.

In this embodiment, one of the first and second spacers 15 and 16 is arranged in the position F in which the flexural amount of the lower half area S2 of the diffusing plate 7 located at the reference position R0, the first rotation position R1, or the second rotation position R2 is increased. However, two or more spacers may be arranged in the above-described positions. In addition, a plurality of spacers may be arranged in the lower half area S2 of the face of the diffusing plate 7, which is located at the reference position R0, the first rotation position R1, or the second rotation position R2, and the upper half area S1 with respect to the direction of gravity. However, in such a case, the number of spacers arranged in the upper half area S1 is configured to be smaller than that of the spacers arranged in the lower half area S2.

Seventh Embodiment

Back Light Unit

FIGS. 15A to 15C are diagrams showing a front face of a back light unit according to a seventh embodiment of the invention, viewed in the horizontal direction.

The back light unit 10 according to this embodiment which is arranged to be inclined upward with respect to the direction of gravity, similar to the sixth embodiment, can be rotated clockwise or counterclockwise by 90 degrees around the center position P of the bottom face 1a of the casing 1. The position shown in FIG. 15A is assumed to be a reference position R0, the position shown in FIG. 15B is assumed to be a first rotation position R1 rotated clockwise by 90 degrees, and the position shown in FIG. 15C is assumed to be a second rotation position R2 rotated counterclockwise by 90 degrees.

According to this embodiment, in the reference position R0 shown in FIG. 15A, a first spacer 17 is arranged on the bottom face 1a in a position F in which the flexural amount of the lower half area S2 of the face of the diffusing plate 7 with respect to the direction of gravity is increased. In addition, a second spacer 18 and a third spacer 19 are arranged on the bottom face 1a and horizontally separated from the vertical center position of the diffusion plate 7.

In addition, the second spacer 18 is arranged in the position F in which the flexural amount of the lower half area S2 of the diffusing plate 7 is increased for a case where the back light unit 10 is rotated to the first rotation position R1 shown in FIG. 15B.

In addition, the third spacer 19 is arranged in the position F in which the flexural amount of the lower half area S2 of the diffusing plate 7 is increased for a case where the back light unit 10 is rotated to the second rotation position R2 shown in FIG. 15C.

According to this embodiment, the number of the spacers is decreased greatly (three spacers 17, 18, and 19), compared to a typical device. Accordingly, the time required for the operation for arranging the spacers 17, 18, and 19 can be shortened greatly, and accordingly the manufacturing cost of the back light unit 10 can be reduced.

In addition, the first spacer 17 suppresses the flexure of the diffusing plate 7 located at the reference position R0, the second spacer 18 suppresses the flexure of the diffusing plate 7 located at the first rotation position R1, and the third spacer 19 suppresses the flexure of the diffusing plate 7 located at the second rotation position R2. Accordingly, the flexure of the diffusing plate 7 can be suppressed even for a case where the back light unit 10 is rotated clockwise or counterclockwise by 90 degrees.

In addition, by decreasing the number of the spacers, the optical characteristic of the light source 2 can be improved.

In this embodiment, one of the first to third spacers 17, 18, and 19 is arranged in the position F in which the flexural amount of the lower half area S2 of the diffusing plate 7 located at the reference position R0, the first rotation position R1, or the second rotation position R2 is increased. However, two or more spacers may be arranged in the above-described positions. In addition, a plurality of spacers may be arranged in the lower half area S2 of the face of the diffusing plate 7, which is located at the reference position R0, the first rotation position R1, or the second rotation position R2, and the upper half area S1 with respect to the direction of gravity. However, in such a case, the number of spacers arranged in the upper half area S1 is configured to be smaller than that of the spacers arranged in the lower half area S2.

In addition, it may be configured that the back light unit 10, as denoted by broken lines shown in FIG. 5, includes a support device 48, and the face of the diffusing plate 7 is configured to be parallel to the direction of gravity or to be inclined with respect to the direction of gravity by a first rotation mechanism 54 of the support device 48. In addition, the back light unit 10 may be configured to rotate, using the first rotation mechanism 54 of the support device 48, the face of the diffusing plate 7 by a predetermined tilt angle β upward with respect to the direction of gravity and by a predetermined tilt angle γ downward with respect to the direction of gravity. In addition, the back light unit 10 may be configured to be rotated to the reference position R0, the first rotation position R1, and the second rotation position R2 by a second rotation mechanism 56 of the support device 48.

In addition, in the above-described embodiment, the back light unit 10 has been described as a device that can be switched to the first rotation position R1 rotated clockwise by 90 degrees with respect to the reference position R0 or the second rotation position R2 rotated counterclockwise by 90 degrees. However, the positions need not be limited to positions rotated by 90 degrees. As denoted by broken lines in FIGS. 8 and 13, the position may be a position rotated clockwise by 45 degrees or a position rotated by any other rotation angle.

Eighth Embodiment

Liquid Crystal Display Device

Hereinafter, a liquid crystal display device as an electro-optical device according to an eighth embodiment of the invention which uses the back light unit 10 according to the second embodiment will be described.

Figure 16:
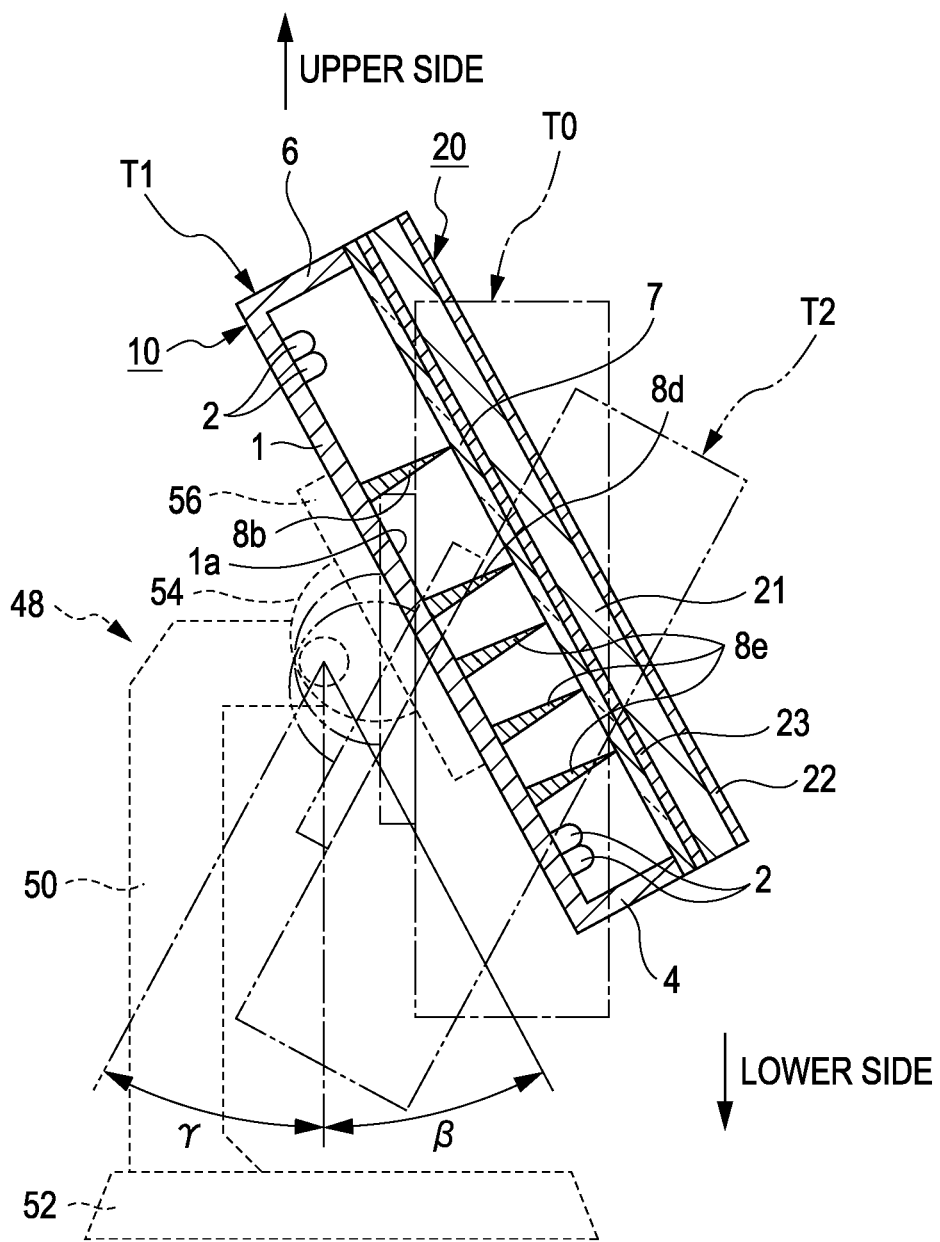
FIG. 16 is a side cross-sectional view of an electro-optical device according to an eighth embodiment of the invention.

FIG. 16 is a side cross-sectional view of the liquid crystal display device according to this embodiment.

The liquid crystal display device 20 of this embodiment includes a liquid crystal display panel 21 that is arranged to be superimposed on the back light unit 10 according to the second embodiment, an upper polarizing plate 22, a lower polarizing plate 23, and a liquid crystal driving IC (not shown).

The liquid crystal display panel 21, although not shown in detail in the figure, is configured by integrally bonding a front side substrate and a rear side substrate that face each other with a liquid crystal layer interposed therebetween by using a sealing member of a frame shape that is disposed between peripheral boarder portions of the two substrates. The front side substrate is configured by forming a liquid crystal aligning control layer having a front side electrode, an alignment film, and the like that are formed of transparent conductive material on a face of a substrate main body, which is a transparent substrate, located on the liquid crystal layer side. The rear side substrate is also configured by forming a liquid crystal aligning control layer having a rear side electrode, an alignment film, and the like that are formed of a transparent conductive material on a face of the substrate main body, which is a transparent substrate, located on the liquid crystal layer side. In addition, on either the front side substrate or the rear side substrate, a drawn-out portion that protrudes to the outer peripheral side of the other is disposed. In this drawn-out portion, a wiring pattern is formed. In addition, the front side electrode located on the front side substrate and the rear side electrode located on the rear side substrate are electrically connected to the wiring pattern that is formed in the drawn-out portion. In addition, on the wiring pattern that is formed in the drawn-out portion, the liquid crystal driving IC that electrically drives the liquid crystal display panel 21 is mounted.

Then, the liquid display panel 21, which has a front face on which the upper polarizing plate 22 is arranged in a layered shape and a rear face on which the lower polarizing plate 23 is arranged in a layered shape, is arranged so as to be superimposed on the diffusing plate 7 of the back light unit 10. The display panel according to this embodiment of the invention corresponds to the liquid crystal display panel 21.

According to this embodiment, the flexure of the diffusing plate 7 of the back light unit 10 is suppressed, and accordingly, uniform light is emitted to the liquid crystal display panel 21. In addition, by decreasing the number of spacers arranged inside the back light unit 10, the optical characteristic of the light source 2 is improved. As a result, a liquid crystal display device 20 that produces a display with high image quality and high luminance can be provided.

Ninth Embodiment

Liquid Crystal Display Device

Hereinafter, a liquid crystal display device as an electro-optical device according to a ninth embodiment of the invention which uses the back light unit 10 according to the fourth embodiment will be described.

FIGS. 17A and 17B are side cross-sectional views of the liquid crystal display device according to this embodiment.

The liquid crystal display device 20 of this embodiment includes a liquid crystal display panel 21 that is arranged so as to be superimposed on the back light unit 10 according to the fourth embodiment, an upper polarizing plate 22, a lower polarizing plate 23, and a liquid crystal driving IC (not shown).

The liquid crystal display device 20 according to this embodiment which is arranged to be inclined upward with respect to the direction of gravity can be rotated to the reference position R0 shown in FIG. 17A and the first rotation position R1 rotated by 90 degrees shown in FIG. 17B.

According to this embodiment, even when the liquid crystal display device 20 is rotated to the reference position R0 or the first rotation position R1, the spacer 12 is arranged on the bottom face 1a in the position F in which the flexural amount of the lower half area S2 of the face of the diffusing plate 7 with respect to the direction of gravity is increased, and accordingly, the flexure of the diffusing plate 7 is suppressed. Therefore, the liquid crystal display device 20 that produces a high image-quality display with high luminance can be provided.

In addition, even when the back light unit is replaced with the back light unit 10 according to the fourth embodiment or the liquid crystal display device 20 using the back light unit 10 according to the fifth embodiment shown in FIGS. 11 and 12 is used, the same advantages can be acquired.

Tenth Embodiment

Liquid Crystal Display Device

Hereinafter, a liquid crystal display device as an electro-optical device according to a tenth embodiment of the invention which uses the back light unit 10 according to the sixth embodiment will be described.

FIGS. 18A to 18C are side cross-sectional views of the liquid crystal display device according to this embodiment.

The liquid crystal display device 20 of this embodiment includes a liquid crystal display panel 21 that is arranged to be superimposed on the back light unit 10 according to the sixth embodiment, an upper polarizing plate 22, a lower polarizing plate 23, and a liquid crystal driving IC (not shown).

The liquid crystal display device 20 according to this embodiment which is arranged to be inclined upward with respect to the direction of gravity can be rotated to the reference position R0 shown in FIG. 18A, the first rotation position R1 rotated clockwise by 90 degrees shown in FIG. 18B, and the second rotation position R2 rotated counterclockwise by 90 degrees shown in FIG. 18C.

According to this embodiment, even when the liquid crystal display device 20 is rotated to the reference position R0, the first rotation position R1, or the second rotation position R2, at least one of the spacers 15 and 16 is arranged on the bottom face 1a in the position F in which the flexural amount of the lower half area S2 of the face of the diffusing plate 7 with respect to the direction of gravity is increased, and accordingly, the flexure of the diffusing plate 7 is suppressed. Therefore, the liquid crystal display device 20 that produces a high image-quality display with high luminance can be provided. In addition, the same advantages can be acquired even when the back light unit is replaced with the back light unit 10 according to the sixth embodiment or when the liquid crystal display device 20 using the back light unit 10 according to the seventh embodiment shown in FIGS. 15A to 15C is used.

In addition, when there is a gap between the liquid crystal display panel 21 and the back light unit 10, as shown in FIG. 19A, the spacer 60 can be arranged on the liquid crystal display panel 21 side of the diffusing plate 7. In addition, as shown in FIG. 19B, a protrusion 62 may be arranged, as a spacer, on the liquid crystal display panel 21 side of the diffusing plate 7. In such a case, the position of the spacer may be the same position as that of the spacer arranged inside the back light unit 10 or may be a different position. Accordingly, even in the liquid crystal display device 20 arranged to be inclined downward with respect to the direction of gravity, the spacer is arranged in the position F in which the flexural amount of the lower half area S2 of the face of the diffusing plate 7 with respect to the direction of gravity is increased, and accordingly the flexure of the diffusing plate 7 is suppressed. Therefore, the liquid crystal display device 20 that produces a high image-quality display with high luminance can be provided.

In addition, it may be configured that the liquid crystal display device 20, as denoted by broken lines shown in FIG. 16, includes a support device 48, and the display area is configured to be parallel to the direction of gravity or to be inclined with respect to the direction of gravity by a first rotation mechanism 54 of the support device 48. In addition, the liquid crystal display device 20 may be configured to be rotatable by a predetermined tilt angle β upward with respect to the direction of gravity and be rotatable by a predetermined tilt angle γ downward with respect to the direction of gravity by the first rotation mechanism 54 of the support device 48. In addition, the liquid crystal display device 20 may be configured to be rotated to the reference position R0, the first rotation position R1, and the second rotation position R2 by a second rotation mechanism 56 of the support device 48.

Eleventh Embodiment

Personal Computer

Hereinafter, a personal computer as an electronic apparatus according to an eleventh embodiment of the invention which uses the liquid crystal display device 20 having the above-described configuration will be described.

Figure 20A:
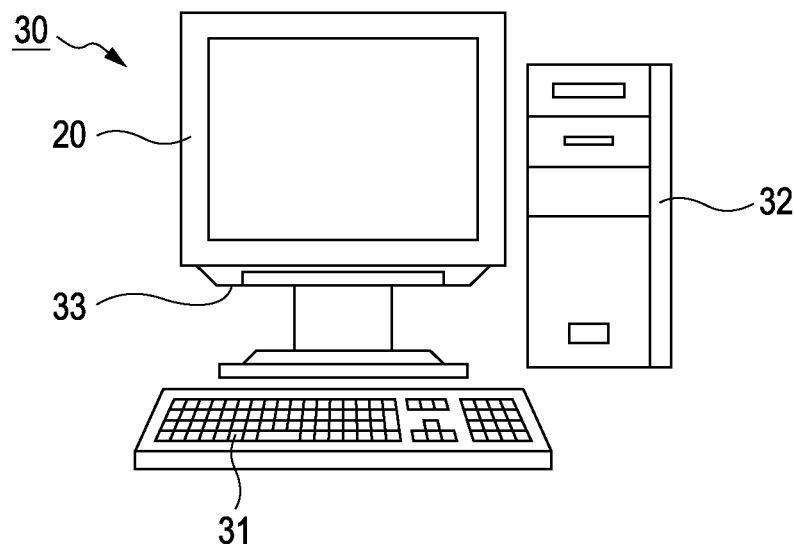
FIGS. 20A and 20B are front views showing an electronic apparatus according to an eleventh embodiment of the invention.
Figure 20B:
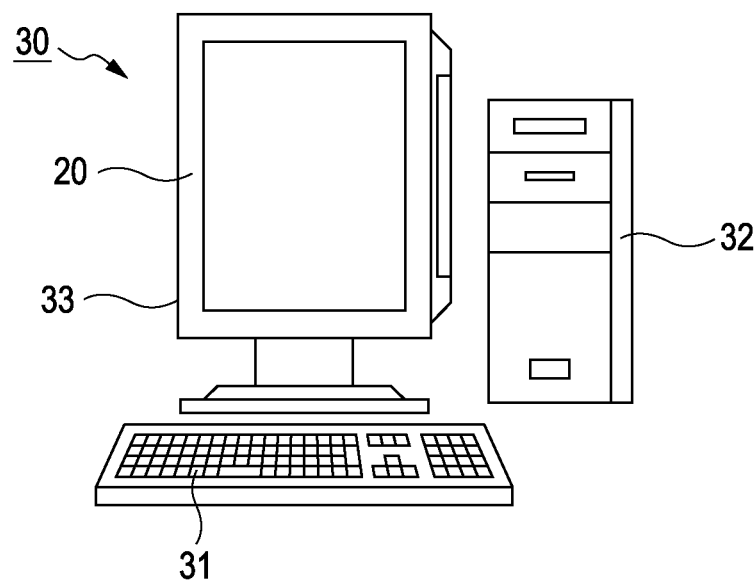

FIGS. 20A and 20B are front views showing the personal computer according to this embodiment. The personal computer 30 shown in FIG. 20A includes a keyboard 31, a main body unit 32, and a vertically arranged display unit 33 to which the liquid crystal display device 20 is applied.

The display unit 33 of this embodiment is the liquid crystal display device 20 having the back light unit 10 according to the sixth embodiment or the seventh embodiment. The display unit 33 can be switched to a horizontal display mode (the reference position R0) shown in FIG. 20A or a vertical display mode (the first rotation position R1) shown in FIG. 20B.

According to the personal computer 30 of this embodiment, the display unit 33 that produces a high image-quality display with high luminance can be provided.

In addition, an electronic apparatus according to this embodiment is not limited to the personal computer 30. Thus, the electronic apparatus may be applied to a display device of a large screen CAD apparatus.

In addition, an optical member of this embodiment is not limited to the diffusing plate 7 that is used in each of the above-described embodiments. Thus, the optical member may be a diffusing sheet or may be formed by superimposing the diffusing plate and the diffusing sheet.

In addition, in the above-described embodiment, the thin-type large screen TV 40 has been described as a device that can be switched to the first rotation position R1 rotated clockwise by 90 degrees with respect to the reference position R0 or the second rotation position R2 rotated counterclockwise by 90 degrees. However, the positions need not be limited to positions rotated by 90 degrees. As denoted by broken lines in FIG. 3, the position may be a position rotated clockwise by 45 degrees or a position rotated by any other rotation angle.

Figure 21A:
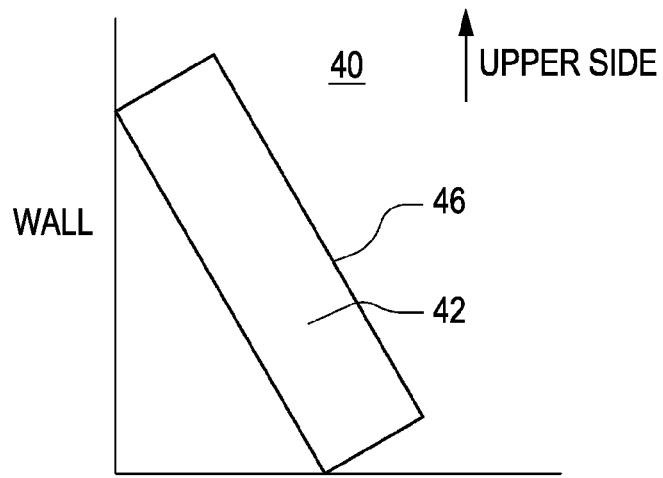
FIGS. 21A to 21C are side views showing electronic apparatuses according to modified examples.
Figure 21B:
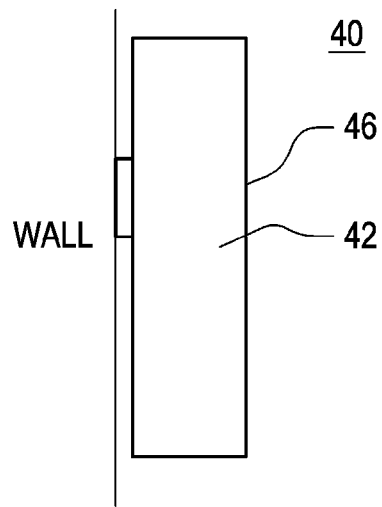
Figure 21C:
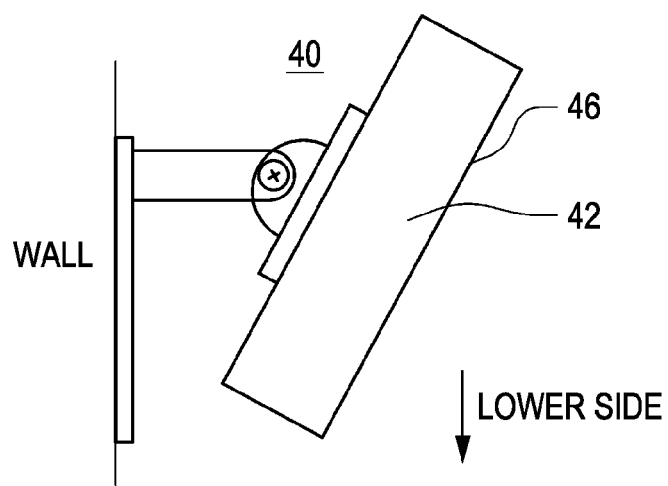

In addition, as a structure not having a support device that supports the thin-type large screen TV, as shown in FIG. 21A, a structure for leaning the thin-type large screen TV against a wall or the like may be used in a state in which the display unit of the thin-type large screen TV faces upward. In addition, as shown in FIG. 21B, a structure for hanging the thin-type large screen TV on the wall may be used in a state in which the display unit of the thin-type large screen TV is arranged parallel to the wall. In addition, as shown in FIG. 21C, a structure for hanging the thin-type large screen TV on the wall may be used in a state in which the display unit of the thin-type large screen TV is arranged so as to face downward. In addition, a structure for fixing the thin-type large screen TV to the ceiling may be used in a state in which the display unit of the thin-type large screen TV is arranged so as to face downward.

(1) There is provided a back light unit that includes a light source, an optical member having a flat shape that is arranged so as to face the irradiation direction of the light of the light source, and a spacer that supports the optical member from the light source side and is arranged in a state in which the optical member is inclined obliquely upward. In addition, the number of spacers arranged in an upper half area of the optical member is configured to be smaller than that of the spacers arranged in a lower half area of the optical member.

(2) In the above-described back light unit, at least one spacer is arranged in the lower half area of the optical member.

(3) The above-described back light unit includes a light source, an optical member having a flat shape that is arranged so as to face the irradiation direction of the light of the light source, and a spacer that supports the optical member from the light source side and is arranged in a state in which the optical member is inclined obliquely upward. The back light unit is formed so as to be freely rotatable to a first rotation position rotated by 90 degrees in any one direction between a clockwise direction and a counterclockwise direction from the reference position. In addition, in the reference position, the number of the spacers arranged in an upper half area of the optical member is configured to be smaller than that of the spacers arranged in a lower half area of the optical member. At least one spacer is arranged in the lower half area of the optical member in any position between the reference position and the first rotation position.

(4) There is provided a back light unit that includes a light source, an optical member having a flat shape that is arranged so as to face the irradiation direction of the light of the light source, and a spacer that supports the optical member from the light source side and is arranged in a state in which the optical member is inclined obliquely upward. The back light unit is formed so as to be freely rotatable to a first rotation position rotated clockwise by 90 degrees from the reference position and a second rotation position rotated counterclockwise by 90 degrees from the reference position. In addition, in the reference position, the number of the spacers arranged in an upper half area of the optical member is configured to be smaller than that of the spacers arranged in a lower half area of the optical member. At least one spacer is arranged in the lower half area of the optical member in any position among the reference position, the first rotation position, and the second rotation position.

(5) In the above-described back light unit, the spacer arranged in the lower half area of the optical member is arranged in a position in which the flexure amount of the lower half area of the optical member is increased.

(6) There is provided an electro-optical device that includes the above-described back light unit and a display panel arranged to be superimposed on the optical member of the back light unit. The display panel is driven such that the area in which the number of the spacers of the back light unit is smaller becomes the upper portion of the display area of the display panel.

(7) There is provided an electro-optical device that includes the above-described back light unit and a display panel arranged to be superimposed on the optical member of the back light unit. In the reference position, the display panel is driven such that the area in which the number of the spacers of the back light unit is smaller becomes the upper portion of the display area of the display panel. On the other hand, in the first rotation position, the display panel is driven such that an area in which at least one spacer is arranged becomes the lower portion of the display area of the display panel.

(8) There is provided an electro-optical device that includes the above-described back light unit and a display panel arranged to be superimposed on the optical member of the back light unit. In the reference position, the display panel is driven such that the area in which the number of the spacers of the back light unit is smaller becomes the upper portion of the display area of the display panel. On the other hand, in the first rotation position and the second rotation position, the display panel is driven such that an area in which at least one spacer is arranged becomes the lower portion of the display area of the display panel.

(9) There is provided an electronic apparatus that includes any one of the above-described electro-optical devices.

The invention claimed is:
1. An electronic apparatus comprising:
a display panel;
a bottom face that is positioned opposite to the display panel;
an optical member having a flat shape that is positioned between the display panel and the bottom face;
a first side wall, a second side wall, a third side wall and a fourth side wall which is positioned between the optical member and the bottom face such that a space is formed surrounded by the optical member, the bottom face, the first side wall, the second side wall, the third side wall and the fourth side wall; and
a plurality of spacers disposed on the bottom face such that support the optical member, wherein:
the first side wall is positioned on an opposite side of that of the second side wall and positioned at a different level in a direction of gravity with respect to the second side wall,
the third side wall and the fourth side wall is positioned between the first side wall and the second side wall, and the third side wall is positioned opposite to the fourth side wall,
the bottom face is divided into a first part and a second part by one line along the first side wall that passes through a midpoint of the third side wall, wherein the first part is positioned between the one line and the first side wall, at least two spacers among the plurality of the spacers are positioned in the first part and at least one spacer among the plurality of the spacers are positioned in the second part, and a first amount of the spacers positioned in the first part is larger than a second amount of the spacers positioned in the second part, a first distance is between the first side wall and a first spacer closest to the first side wall among the at least two spacers disposed in the first part, a second distance is between the second side wall and a second spacer closest to the second side wall among the plurality of spacers, the first distance is smaller than the second distance, a seventh distance is between the one line and a first spacer closest to the one line among the at least two spacers disposed in the first part, and an eighth distance is between the one line and a eighth spacer closest to the one line among at least one spacer among the plurality of the spacers positioned in the second part, and the seventh distance is smaller than the eighth distance.

2. An electronic apparatus comprising:

a display panel;

an optical member having a flat shape above which the display panel is positioned; and a bottom face that is positioned opposite to the optical member with respect to the display panel, the bottom face includes a first side, a second side, a third side and fourth side, the first side is positioned at a side opposite that of the second side and positioned at a different level relative to a direction of gravity with respect to the second side, the third side and the a fourth side is positioned between the first side and the second side, and the third side is positioned opposite to the fourth side, wherein the bottom face is divided into a first area and a second area by a first line along the first side that passes through a midpoint of the third side, the first area is positioned between the first line and the first side, the second area is positioned between the first line and the second side, a plurality of first spacers are positioned on the first area, and a plurality of second spacers are positioned on the second area, an amount of the first spacers is larger than an amount of the second spacers, a first distance is between the first side and a third spacer that is closest to the first side among the first spacers, a second distance is between the second side and a fourth spacer that is closest to the second side among the second spacers, and the first distance is smaller than the second distance.

3. The electronic apparatus according to claim 2, wherein the plurality of the first spacers and the plurality of the second spacers support the optical member.

4. The electronic apparatus according to claim 2, wherein the first area and the second area are isometric.

5. The electronic apparatus according to claim 2, wherein the third side and the direction of the gravity are located on a first plane, and the fourth side and the direction of the gravity are located on a second plane.

6. The electronic apparatus according to claim 2, further comprising:

a plurality of light sources disposed on the bottom face.

7. The electronic apparatus according to claim 2, wherein a third distance is between the third side and a fifth spacer that is closest to the third side among the first spacers, and a fourth distance is between the third side and a sixth spacer that is closest to the third side among the second spacers, and wherein the third distance is smaller than the fourth distance.

8. The electronic apparatus according to claim 2, wherein a fifth distance is between the first line and a seventh spacer that is closest to the first line among the first spacers, and a sixth distance is between the first line and a eighth spacer that is closest to the first line among the second spacers, and wherein the fifth distance is smaller than the sixth distance.

9. An electronic apparatus comprising:

a display panel;

an optical member having a flat shape above which the display panel is positioned; and a bottom face that is positioned opposite to the optical member with respect to the display panel, the bottom face including a first side, a second side, a third side and a fourth side, wherein the first side is positioned at a side opposite that of the second side and positioned at a different level relative to a direction of gravity with respect to the second side, the third side and the fourth side is positioned between the first side and the second side, and the third side is positioned opposite to the fourth side, wherein the bottom face is divided into a first area and a second area by a first line along the first side that passes through a midpoint of the third side, the first area is positioned between the first line and the first side, the second area is positioned between the first line and the second side, a plurality of first spacers are positioned on the first area and a plurality of second spacers are positioned on the second area, and a first density of the first spacers in the first area is larger than a second density of the second spacers in the second area, wherein a first distance is between the first side wall and a first spacer closest to the first side wall among the at least two spacers disposed in the first part, a second distance is between the second side wall and a second spacer closest to the second side wall among the plurality of spacers, and the first distance is smaller than the second distance.

* * * * *